United States Patent [19]

Kaji

[11] Patent Number: 5,408,410
[45] Date of Patent: Apr. 18, 1995

[54] METHOD OF AND AN APPARATUS FOR AUTOMATICALLY EVALUATING MACHINE TRANSLATION SYSTEM THROUGH COMPARISON OF THEIR TRANSLATION RESULTS WITH HUMAN TRANSLATED SENTENCES

[75] Inventor: Hiroyuki Kaji, Tama, Japan

[73] Assignee: Hitachi, Ltd., Tokyo, Japan

[21] Appl. No.: 47,150

[22] Filed: Apr. 13, 1993

[30] Foreign Application Priority Data

Apr. 17, 1992 [JP] Japan ................................. 4-097656

[51] Int. Cl.⁶ ......................................... G06F 15/38
[52] U.S. Cl. ........................... 364/419.02; 364/419.08
[58] Field of Search ...................... 364/419.02, 419.04, 364/419.05, 419.08

[56] References Cited

U.S. PATENT DOCUMENTS

| | | | |
|---|---|---|---|
| 4,597,055 | 6/1986 | Hashimoto et al. | 364/419.05 |
| 4,599,612 | 7/1986 | Kaji et al. | 364/419.02 |
| 4,791,587 | 12/1988 | Doi | 364/419.02 |
| 5,005,127 | 4/1991 | Kugimiya et al. | 364/419.05 |
| 5,128,865 | 7/1992 | Sadler | 364/419.02 |
| 5,140,522 | 8/1992 | Ito et al. | 364/419.02 |

FOREIGN PATENT DOCUMENTS 58-40684 3/1983 Japan .

OTHER PUBLICATIONS

Journal of the Information Processing Society of Japan, vol. 26, No. 10, Oct. 1985, pp. 1197–1202. (Japanese).
Lehrberger, John et al. *Machine Translation*, published by John Benjamins Publishing Company, 1988, pp. 207–212. (English).

*Primary Examiner*—Robert A. Weinhardt
*Attorney, Agent, or Firm*—Fay, Sharpe, Beall, Fagan, Minnich & McKee

[57] ABSTRACT

To evaluate by a computer translated sentences obtained from a machine translation system so as to automatically and objectively evaluate quality of the system, a method and an apparatus are provided for automatically evaluating translated sentences. The method includes a first translated sentence analysis step of analyzing sentences resulted from a machine translation, a second translated sentence analysis step of analyzing favorable translated sentences for original sentences, a word/phrase coupling step of analyzing correspondence of words and phrases between the two translated sentences for the same original sentence, and a similarity calculating step of computing similarity between the two translated sentences according to ratios of words and phrases thus related to each other and similarity of the related words and phrases, thereby evaluating the sentences generated through the machine translation.

20 Claims, 22 Drawing Sheets

FIG. 2

| ENTRY WORD 311 | ENTRY WORD'S ATTRIBUTE INFORMATION 312 | | TRANSLATION WORD 313 | TRANSLATION WORD'S ATTRIBUTE INFORMATION 314 | |
|---|---|---|---|---|---|
| age | V | shimoichidan ACT | RAISE | V | -S,-D,-D,E→ING |
| | | | INCREASE | V | -S,-D,-D,E→ING |
| | | | CITE | V | -S,-D,-D,E→ING |
| ~ | ~ | | ~ | | |
| souchi | N | CONCRETE OBJECT — | EQUIPMENT | N | -S |
| | | | DEVICE | N | -S |
| ~ | ~ | | ~ | | |
| daihyoteki | AV | — — | REPRESENTATIVE | ADJ | MORE, MOST |
| | | | TYPICAL | ADJ | MORE, MOST |

| ENTRY WORD (321) | RECORD TYPE (322) | PART OF SPEECH (323) | INFLECTION PATTERN (324) |
|---|---|---|---|
| AS | 0 | CNJ | |
| | | P | |
| ~ | ~ | ~ | ~ |
| CITE | 0 | V | -S,-D,-D,E→ING |
| ~ | ~ | ~ | ~ |
| DEVICE | 0 | N | S |
| ~ | ~ | ~ | ~ |
| EQUIPMENT | 0 | N | S |
| ~ | ~ | ~ | ~ |
| INCLUDE | 0 | V | -S,-D,-D,E→ING |
| ~ | ~ | ~ | ~ |
| REPRESENTATIVE | 0 | ADJ | MORE,MOST |
| ~ | ~ | ~ | ~ |
| TAKE | 0 | V | -S,TOOK,TAKEN,E→ING |
| ~ | ~ | ~ | ~ |
| THE | 0 | ART | |
| ~ | ~ | ~ | ~ |
| TOOK | 1 | V | TAKE |
| ~ | ~ | ~ | ~ |
| TYPICAL | 0 | ADJ | MORE,MOST |

| 1ST WORD (331) | 2ND WORD (332) | SYNONYMITY (333) |
|---|---|---|
| CITE | MENTION | 0.5 |
|  | RAISE | 0.0 |
|  | INCREASE | 0.0 |
| ~ | ~ | ~ |
| DEVICE | EQUIPMENT | 0.0 |
| ~ | ~ | ~ |
| EQUIPMENT | DEVICE | 0.0 |
| ~ | ~ | ~ |
| INCREASE | RAISE | 0.0 |
|  | CITE | 0.0 |
| ~ | ~ | ~ |
| RAISE | CITE | 0.0 |
|  | INCREASE | 0.0 |
| ~ | ~ | ~ |
| REPRESENTATIVE | TYPICAL | 0.5 |
| ~ | ~ | ~ |
| TYPICAL | REPRESENTATIVE | 0.5 |

FIG. 7A

| BASIC FORM | PART OF SPEECH | OCCURRED FORM | TYPE |
|---|---|---|---|
| a | ART | – | F |
| MASER | N | SINGULAR | C |
| AND | CNJ | – | F |
| A | ART | – | F |
| LASER | N | SINGULAR | C |
| BE | AUXV | PRESENT,PLURAL | F |
| CITE | V | PAST PARTICIPLE | C |
| AS | P | – | F |
| A | ART | – | F |
| REPRESENTATIVE | ADJ | – | C |
| DEVICE | N | SINGULAR | C |

FIG. 7B

| BASIC FORM | PART OF SPEECH | OCCURRED FORM | TYPE |
|---|---|---|---|
| TYPICAL | ADJ | – | C |
| DEVICE | N | PLURAL | C |
| INCLUDE | V | PRESENT,PLURAL | C |
| A | ART | – | F |
| MASER | N | SINGULAR | C |
| AND | CNJ | – | F |
| A | ART | – | F |
| LASER | N | SINGULAR | C |

FIG. 9A

| BASIC FORM (211) | PART OF SPEECH (212) | OCCURRED FORM (213) | TYPE (214) |
|---|---|---|---|
| MASER | N | SINGULAR | C |
| LASER | N | SINGULAR | C |
| CITE | V | PAST PARTICIPLE | C |
| REPRESENTATIVE | ADJ | - | C |
| DEVICE | N | SINGULAR | C |

FIG. 9B

| BASIC FORM (211) | PART OF SPEECH (212) | OCCURRED FORM (213) | TYPE (214) |
|---|---|---|---|
| TYPICAL | ADJ | - | C |
| DEVICE | N | PLURAL | C |
| INCLUDE | V | PRESENT,PLURAL | C |
| MASER | N | SINGULAR | C |
| LASER | N | SINGULAR | C |

| CONTENT WORD | SYNONYMITY |
|---|---|
| TYPICAL | 0.5 |
| DEVICE | 1.0 |
| INCLUDE | 0.0 |
| MASER | 1.0 |
| LASER | 1.0 |

| CONTENT | FLAG |
|---|---|
| MASER | 1 |
| LASER | 1 |
| CITE | 0 |
| REPRESENTATIVE | 1 |
| DEVICE | 1 |

FIG. 18

| PHRASE MARKER | DEGREE OF CONTRIBUTION |
|---|---|
| ADJ | 1.0 |
| ADV | 1.0 |
| N | 1.0 |
| NP | 0.5 |
| PP | 1.0 |
| S | 1.0 |
| V | 2.0 |
| VP | 1.0 |

FIG. 19

| FEATURE OF PHRASE (SUPPLEMENTARY INFORMATION) | DEMERIT MARK |
|---|---|
| N : DISAGREEMENT OF NUMBER | 0.3 |
| NP : DISAGREEMENT OF DEFINITENESS | 0.3 |
| PP : DIFFERENT PREPOSITION | 0.5 |
| V1 : DIFFERENT TENSE | 0.3 |
| DIFFERENT ORDER OF CONSTITUENTS | 0.5 |

JAPANESE SENTENCE
 daihyotekina souchi tosite rehza ya mehza ga agerareru

ENGLISH SENTENCE
    A MASER AND A LASER ARE CITED
    AS A REPRESENTATIVE DEVICE.

GRADE : 0.52

STANDARD TRANSLATION
        TYPICAL DEVICES INCLUDE A MASER
              AND A LASER.

METHOD OF AND AN APPARATUS FOR AUTOMATICALLY EVALUATING MACHINE TRANSLATION SYSTEM THROUGH COMPARISON OF THEIR TRANSLATION RESULTS WITH HUMAN TRANSLATED SENTENCES

BACKGROUND OF THE INVENTION

1. Field of the Invention

The present invention relates to a machine translation system, and in particular, to a method of and an apparatus for automatically and objectively evaluating quality of sentences translated through a machine translation.

2. Description of the Related Art

In a machine translation system between natural languages, for example, between Japanese and English, there has been difficulty in developing a translation quality similar to that developed by a human translator. Consequently, it is important for the developer and the user of the machine translation system to quantitatively and objectively evaluate the quality of sentences resultant from the machine translation.

Conventional technologies relating to evaluation of quality of translated sentences have been described, for example, on pages 1197 to 1202 of the "Journal of the Information Processing of Society of Japan", Vol. 26, No. 10, October 1985 and on pages 207 to 212 of the "Machine Translation" written by J. Lehrberger and L. Bourbeau and published from JHON BENJAMINS PUBLISHING COMPANY in 1988. Typically, according to a conventional method of evaluating translated sentences, for fidelity of translated sentences with respect to original sentences and intelligibility of translated sentences, there have been beforehand determined ranks or grades and criteria for judgement of such ranks so that a human evaluator checks each translated sentence obtained from the machine translation system to thereby determine the rank thereof.

However, in this type of evaluation according to the ranks, the evaluation of quality of translated sentences is accomplished by a human and necessitates quite a long period of time. Moreover, the decision of ranks for translated sentences varies from individual to individual and hence there arises a problem that the quality evaluation cannot be definitely regarded as objective.

SUMMARY OF THE INVENTION

It is therefore an object of the present invention to enable a computer to evaluate translated sentences so as to solve the problems above, thereby automatically and objectively evaluating the quality of sentences translated by a machine translation system.

According to the present invention, to evaluate the translated sentences by a computer, attention has been attracted onto utilization of favorable sentences translated by a human. That is, a comparison is made between a first translated sentence produced for an original sentence from a machine translation system and a second translated sentence, i.e. a favorable sentence translated by a human for the original sentence. Resultantly, there is computed lexical and syntactical similarity therebetween, which is regarded as evaluation of quality of the first translated sentence. It will be assumed herebelow that a sentence obtained by translating an original sentence by a machine translation system is called a first translated sentence; whereas, a favorable sentence of the identical original sentence translated by a human is called a second translated sentence. Furthermore, it is assumed that a language used to describe the original sentence is called a first language; whereas, a language adopted to describe a sentence obtained through the translation is called a second language. The evaluation of translated sentences based on the idea above is achieved by the following constitution according to the present invention.

In accordance with one aspect of the present invention, there is provided a method of evaluating translated sentences comprising a first translated sentence analyzing step of achieving a morphological analysis on a first translated sentence in a second language obtained by translating an original sentence in a first language by a machine translation system, a second translated sentence analyzing step of conducting a morphological analysis on a second translated sentence in the second language beforehand generated for the original sentence, a word coupling step for coupling words between the first and second translated sentences, and a similarity computing step of computing, based on a result from the word coupling step, a lexical similarity between the first and second translated sentences. The first translated sentence is evaluated according to the attained similarity, thereby evaluating the machine translation system.

As described above, when translating sentences between languages of which language structure is similar to each other, quality of translated sentences can be easily evaluated by computing only the lexical similarity. This method is applicable, for example, to translated sentences in a translation between English and Spanish or between Japanese and Korean.

Adding a syntactic analysis to each of the first and second translated sentence analysis steps above, there can be computed lexical and syntactic similarity, which makes it possible to easily evaluate translated sentences in a translation between languages of which language structure is completely different from each other. This method can be applied to evaluation of translated sentences in a translation, for example, between English and Korean or between Japanese and Spanish.

In the method of evaluating translated sentences according to the present invention, there may be prepared a translated sentence set including plural kinds of second translated sentences for an original sentence so as to compute similarity between the first translated sentence and each of the plural second translated sentences of the set, thereby determining the best grade from the obtained similarity. The best grade is assumed to be the evaluation rank of the first translated sentence, which much more improves precision of the evaluation.

In the method of evaluating translated sentences according to the present invention, the first translated sentence may be edited and used as the second translated sentence so as to similarly evaluate the first translated sentence. Resultantly, the sentence obtained by editing the translation result from the machine translation system is adopted as the favorable second translated sentence. According to this method, the second translated sentence need not be created in advance.

In the method of evaluating translated sentences according to the present invention, there may be prepared a plurality of pairs each being constituted of a first translated sentence and a second translated sentence so as to compute similarity for each of the sentence pairs, thereby obtaining at least either one of an average of similarity, distribution of similarity, and an average of similarity obtained for each range of length of original sentence. Depending on the obtained average and distribution, the machine translation system is evaluated. In short, the results of evaluation of the first translated sentence is statistically processed to improve reliability of the evaluation results of the machine translation system.

Moreover, in the method of evaluating translated sentences according to the present invention, when conducting comparison between new version and old version of a machine translation system, there may be computed, for an original sentence, similarity to a second translated sentence, respectively for a first translated sentence (A) produced by the modified or new version machine translation system and a first translated sentence (B) produced by the old version machine translation system. The above processing is conducted for plural original sentences. From the sentences, there is selected an original sentence of which similarity between the first translated sentence (A) and the second translated sentence is lower than that between the first translated sentence (B) and the second translated sentence. The system displays the selected original sentence, two first translated sentences (A) and (B) and the second translated sentence associated therewith. As a result, there can be extracted patterns of original sentences which cannot be appropriately processed when the translation system is modified or updated.

According to the present invention, there is provided an apparatus for evaluating translated sentences by combining measures respectively corresponding to the steps of the method of evaluating translated sentences above.

The evaluation method according to one aspect of the present invention operates as follows. Assume first that there are beforehand prepared a first translated sentence as a result of translation of an original sentence obtained from the machine translation system and a second translated sentence as a favorable translated sentence for the original sentence. In the step of analyzing the first translated sentence, a morphological analysis and a syntactic analysis are executed to produce a word table indicating words constituting the first translated sentence and a phrase structure analysis table indicating phrases composing the first translated sentence. Similarly, in the step of analyzing the second translated sentence, a morphological analysis and a syntactic analysis are executed to produce a word table indicating words constituting the second translated sentence and a phrase structure analysis table indicating phrases composing the second translated sentence. Thereafter, in the word/phrase coupling step, based on the word and phrase structure tables of each of the first and second translated sentences, word/phrase correspondence between the first and second translated sentences is extracted to generate a word/phrase correspondence table. In the similarity calculation step, according to the word/phrase correspondence table, there is computed lexical and syntactic similarity between the first and second translated sentences.

The operations also apply to the apparatus for evaluating translated sentences according to the aspect of the present invention.

Furthermore, in a machine translation system having a function for evaluating translated sentences according to the present invention, there are read an original sentence in a first language and a second translated sentence (favorable sentence) in a second language beforehand prepared for the original sentence. The original sentence in the first language is translated by machine translation means into a first translated sentence so as to compute similarity between the first and second translated sentences, thereby evaluating the translated sentence.

BRIEF DESCRIPTION OF THE DRAWINGS

These and other objects and advantages of the present invention will become apparent with reference to the following description and accompanying drawings wherein:

FIG. 2 is a schematic diagram showing records of a bilingual or translation dictionary;

FIG. 3 is a schematic diagram showing records of an English word dictionary;

FIG. 4 is a schematic diagram showing records of an English word correlation dictionary;

FIGS. 7A and 7B are diagrams useful to explain word tables;

FIGS. 9A and 9B are diagrams for explaining reduced word tables;

FIG. 18 is a diagram useful to explain a phrase's weight table;

FIG. 19 a diagram showing a demerit mark table;

DESCRIPTION OF THE PREFERRED EMBODIMENTS

Figure 1:
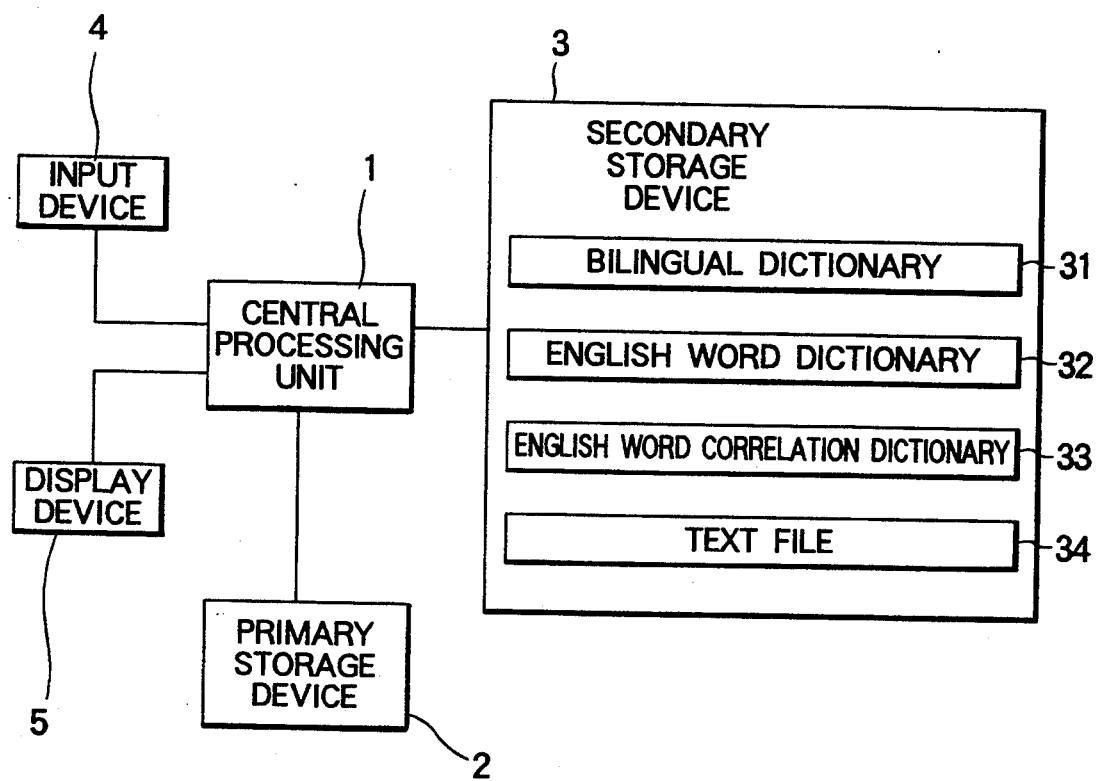
FIG. 1 a diagram showing the hardware configuration of a Japanese-English machine translation system in an embodiment of the machine translation system according to the present invention.

Referring now to the drawings, description will be given of a Japanese-English machine translation system in an embodiment of the machine translation system according to the present invention.

FIG. 1 shows the hardware structure of the translation system including a central processing unit (CPU) 1, a primary storage device 2, a secondary storage device 3, an input device 4, and a display device 5. In the system, the CPU 1 executes programs stored in the storage 2 to thereby develop functions thereof. In the storage 2, there are also stored various tables produced at intermediate points of system processing. The secondary storage 3 is utilized to store therein a bilingual dictionary 31, an English word dictionary 32, an English word correlation dictionary 33, and a text file 34. From the input device 4, bilingual pairs of texts are read in the system. The display 5 is disposed to present evaluation results of translated sentences.

The bilingual dictionary 31 of FIG. 1 is a set of records as shown in FIG. 2 in which each record is constituted of a Japanese entry word 311, entry word's attribute information 312 including items such as a part of speech, an inflection pattern, and a semantic marker, an English translation word 313 for the entry word, and translation word's attribute information 314 including items such as a part of speech and an inflection pattern. Each record of the dictionary 31 is retrieved therefrom with the entry word 311 set as a search key.

The English word dictionary 32 of FIG. 1 is a set of record as shown in FIG. 3 in which each record is constituted of an entry (English) word 311, a part of speech thereof 323, and an inflection pattern thereof 324. For a word inflecting irregularly, in addition to the basic form, there is additionally stored an inflectional form in the entry word field 321 such that the basic form thereof is stored in the inflection pattern field 324. For discrimination between two kinds of records having an identical basic form, for example, between "take" and "took", each record contains a record type 322, which is expressed as "0" or "1". The value "1" denotes an irregular inflection. Either records can be retrieved with the entry word 321 set as a search key.

In the English word correlation dictionary 33 of FIG. 1, there are stored English words which are synonymous each other and English words which are translations of an identical Japanese word. Each record of the dictionary 33 includes, as shown in FIG. 4, a first word 331, at least one second word 332, and synonymity 333 of each second word with respect to the first word. The record can be retrieved with the first word 331 set as a search key. The first word 331 and the second word 332 are stored in the basic form thereof. The value of synonymity 333 is "0.5" or "0.0" when the second word 332 is a synonym or a different meaning word of the first word 331, respectively.

Figure 5:
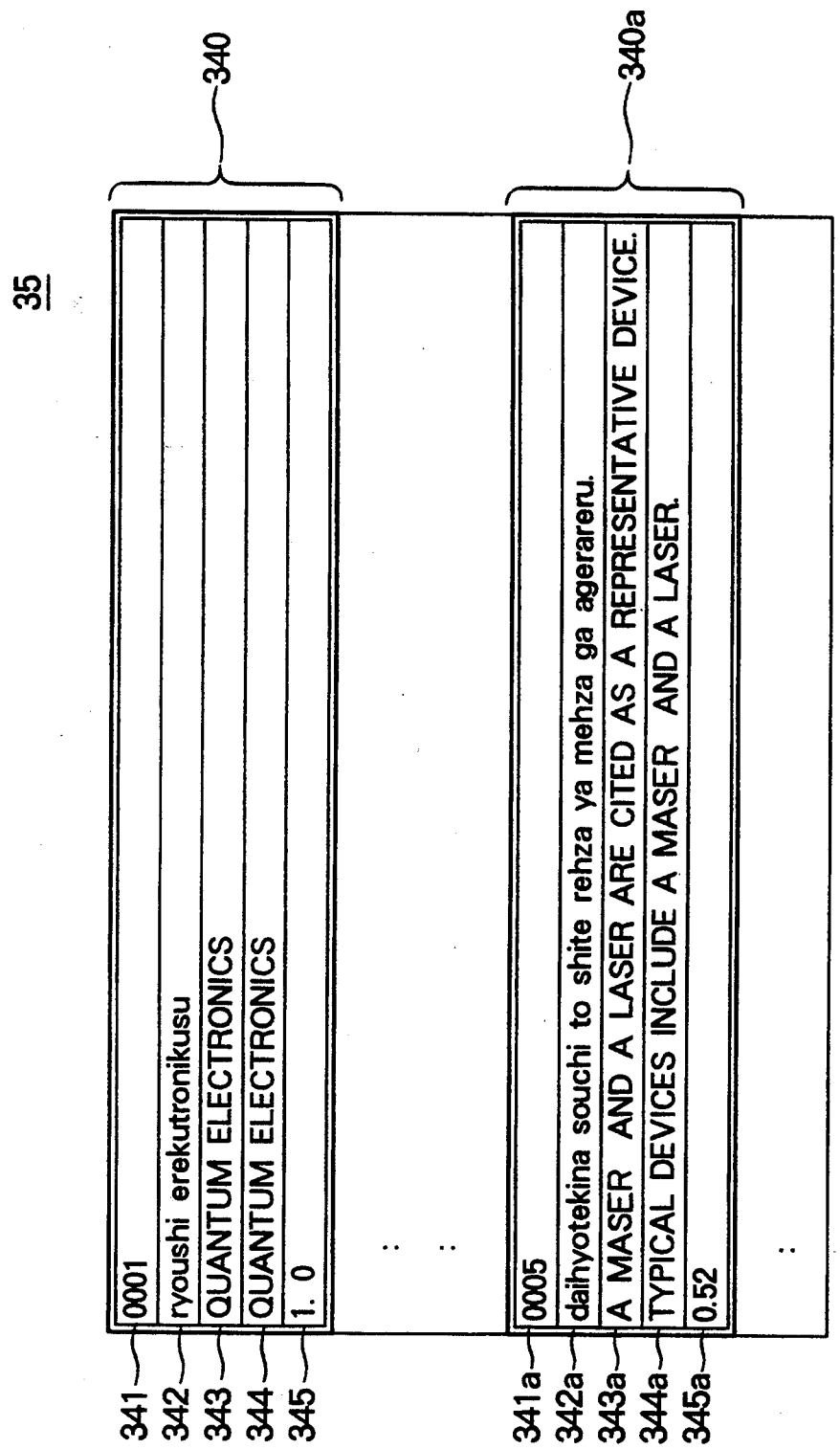
FIG. 5 is a schematic diagram showing records of a text file.

The text file 34 of FIG. 1 is a set of records each being constituted of, as shown in FIG. 5, a sentence number 341, an original sentence 342, a first translated sentence 343, a second translated sentence 344, and a grade 345. To register, to retrieve, or to update the record 340, the sentence number 341 is set as a key for the operation. A record 340a is configured in the same manner as for the record 340.

Figure 6:
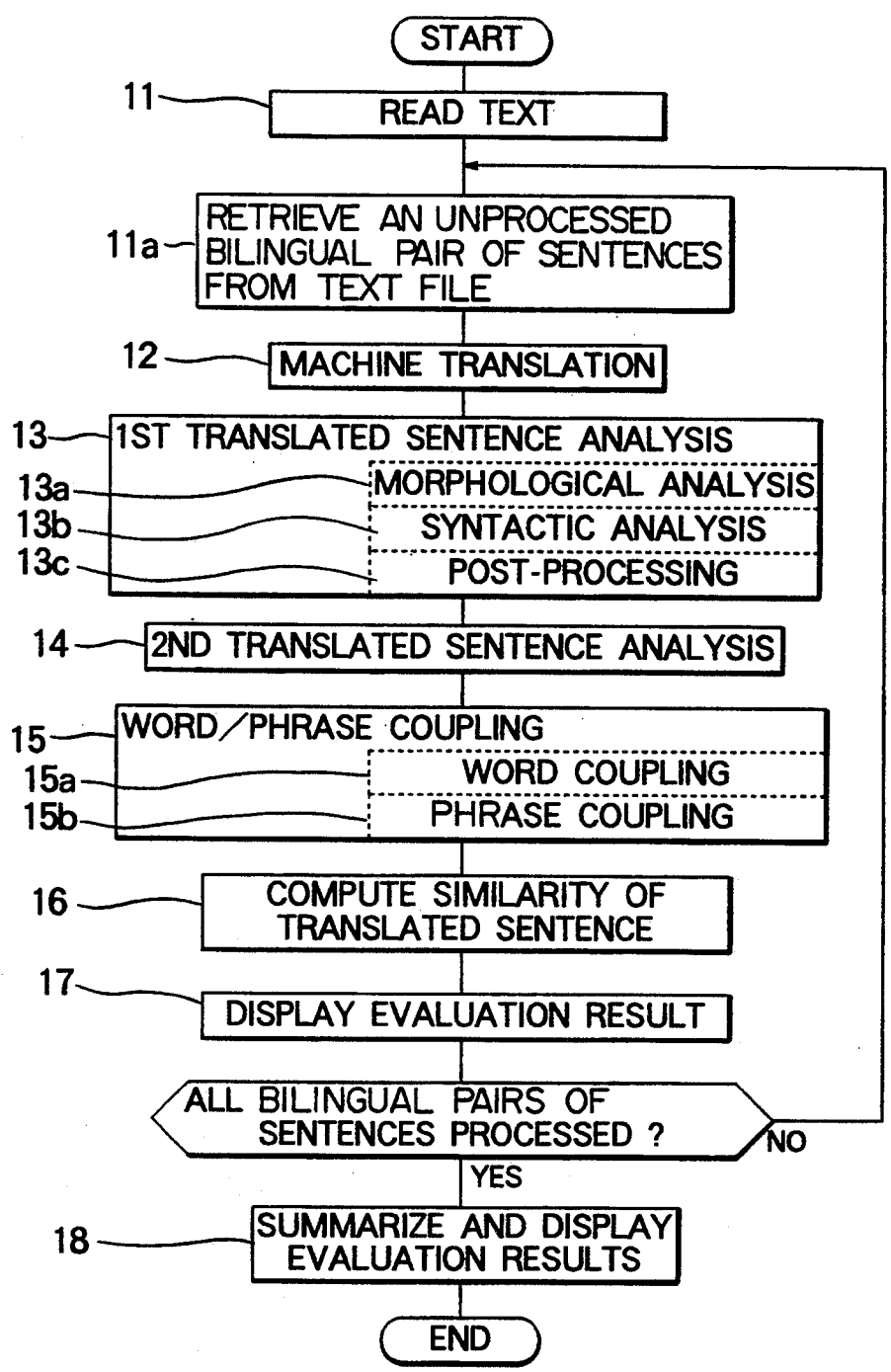
FIG. 6 a flowchart showing processing to evaluate translated sentences.

FIG. 6 shows a flowchart of processing executed by the CPU 1 of FIG. 1. The processing procedure of FIG. 6 will now be described according to the hardware structure shown in FIG. 1.

First, in a text read step 111, a bilingual text prepared by the user is read from the input device 4 to be stored in the text file 34 of FIG. 1. In this operation, a Japanese sentence and an English sentence equivalent thereto are supplied in pair. Consequently, in the step 11, there are registered a record in which, as shown in FIG. 5, a sequence number assigned in an input order to the bilingual pair of sentences is set as the sentence number 341, the inputted Japanese sentence is stored as the original sentence 342, and the inputted English sentence is as the second translated sentence 344. In this stage, the fields 343 and 345 are empty in the record.

In a step 11a thereafter, each bilingual pair of sentences to be processed is read from the text file 34. For the bilingual pair of sentences, processing ranging from a machine translation step 12 to an evaluation result display step 17 of FIG. 6 is carried out as follows.

In the first step 12, by consulting the bilingual dictionary 31 of FIG. 2, the Japanese original sentence 342 in the record read from the text file 34 of FIG. 5, for example, "daihyoutekina souchi toshite rehza ya mehza ga agerareru" (342a) is translated into English to be written as the first translated sentence 343a of the record 340a in the file 34 of FIG. 5. Although there have been proposed various methods of machine translation, the present invention is applicable to machine translation systems regardless of the methods thereof.

The first translated sentence analysis step 13 is constructed of three sub-steps, namely, a morphological analysis 13a, a syntactic analysis 13b, and post-processing 13c. In the sub-step 13a, consulting the English word dictionary 32 of FIG. 3, words constituting the first translated sentence 343a of FIG. 5 are identified. A method of morphologically analyzing English sentences has been described, for example, in the JP-A-58-40684. A processing result of the sub-step 13a is outputted to a word table shown in FIG. 7A.

FIG. 7A shows a word table attained from the first translated sentence (343a of FIG. 5), namely, "A maser and a laser are cited as a representative device." The word table contains the words constituting the translated sentence beginning from the head thereof. There are kept in the table, for each word, a basic form 211, a part of speech 212, information indicating an occurred form 213, and a type 214 denoting a content word or a function word. For a word having a plurality of parts of speech, the part of speech may be or may not be identified according to relationships thereof with the words preceding and succeeding thereto. In a case where the identification of the part of speech is impossible, a plurality of parts of speech are listed in the field of the part of speech 212 such that the information 213 denoting the occurred form in the sentence and the type of content/function word 214 are written in the record in association with each of the parts of speech. The type 214 is decided according to a part of speech, namely, items such as a noun, a verb, and an adjective are classified into a content word (designated by C); whereas, items such as a preposition a conjunction, and an article are assumed to be function words (denoted by F). Since the word table already includes the part of speech 212, the type 214 may be regarded as redundant information; however, to facilitate the post-processing 13c, the information item is set in the records in the word table.

In the sub-step 13b of FIG. 6, using a parallel syntactic analysis method, for example, a Cocke-Younger-Kasami (CYK) method, there can be extracted any possible phrases contained in the first translated sentence 343a of FIG. 5. This results in production of a phrase structure analysis table shown in FIG. 8A.

Figure 8A:
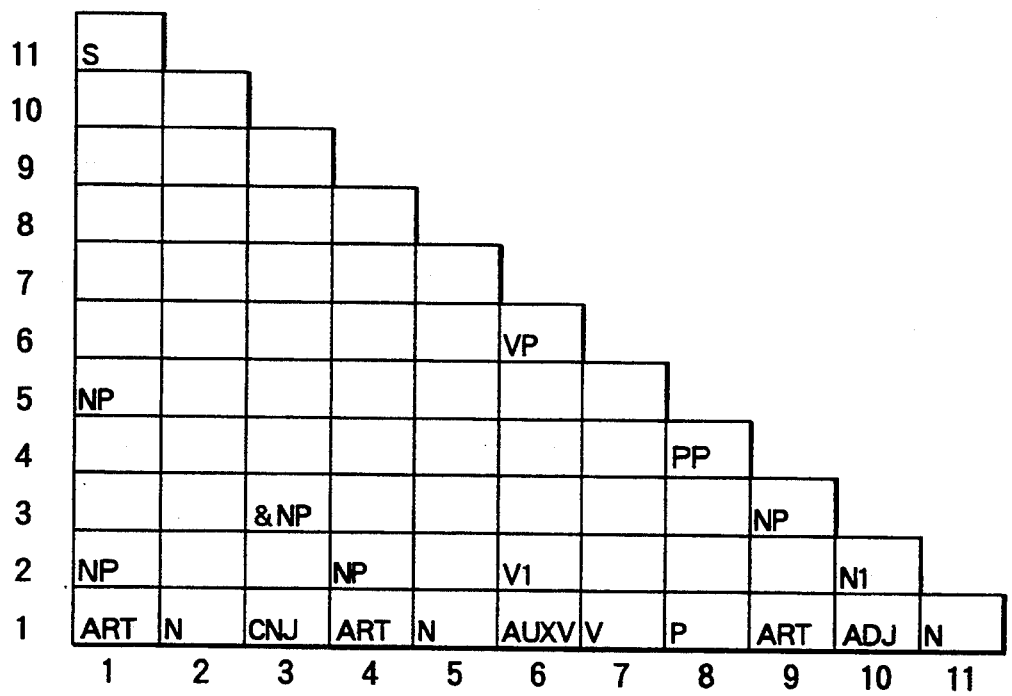
FIGS. 8A and 8B are diagrams showing phase structure analysis tables.
Figure 8B:
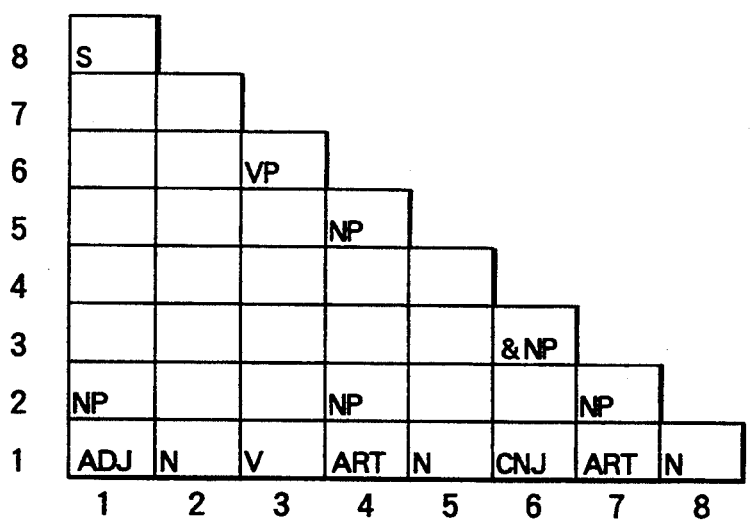

FIG. 8A shows a phrase structure analysis table attained for the first translated sentence "A maser and a laser are cited as a representative device." The table is in the form of a triangular matrix. In the matrix, an element at an i-th position from the left thereof and at a j-th position from the bottom thereof is referred to as an (i,j) element herebelow.

In each element of the matrix, an empty indication or at least one phrase marker is written together with supplementary information. The phrase marker is a symbol to identify a kind of the phrase. When a phrase is constituted of a plurality of words, the phrase marker is assigned as a symbol corresponding to a noun phrase, a verb phrase, or the like. When a phrase is configured with only one word, the phrase marker is assigned with a symbol associated with a noun, a verb, or the like. In a translated sentence, when j words ranging from an i-th word to an (i+j−1)-th word construct a phrase, the phrase marker is written in the element (i,j) of the phrase structure analysis table. In a case where it is possible to assign several kinds of phrase markers to a sequence of j words ranging from an i-th word to an (i+j−1)-th word, a plurality of possible phrase markers are written in the element (i,j). Supplementary information items of phrase markers are each obtained at an intermediate point of the syntactic analysis and are referenced by the similarity calculation step 16.

For example, supplementary information is denoted as follows: for the marker N (noun), information of singular/plural; for the marker NP (noun phrase), information of definiteness of the noun phrase; for the marker PP (preposition phrase), a preposition (for, in, or the like) constituting the phrase; and for the marker V1 (phrase constituted with a verb and an auxiliary verb), information of tense. Moreover, a sequence of phrase markers of elements constituting a phrase is also supplementary information. In this regard, in the phrase structure table of FIG. 8A, supplementary information is omitted and only phrase markers are shown due to the limited space.

A specific example of table elements will now be described by reference to FIG. 8A. Among the elements (i,j), the element (1,5) is assigned NP (noun phrase) and hence represents that "a maser and a laser" is a noun phrase (NP). Furthermore, the element (6,6) denotes that "be cited as a representative device" is a verb phrase (VP).

In the post-processing sub-step 13c, the word table of FIG. 7A and the phrase structure analysis table of FIG. 8A are reorganized so that the tables contain only the elements corresponding to the content words forming the meaning of the translated sentence. That is, the function words such as a preposition, a conjunction, and an article are removed therefrom. The word table and the phrase structure analysis table are resultantly changed to a reduced word table and a reduced phrase structure analysis table, respectively. These tables are produced for the following reason. In the word/phrase coupling step 15 of FIG. 6 to be executed later, the word coupling operation is limitatively achieved for the content words and the phrase coupling operation is also carried out according to correspondence between content words.

Figure 10:
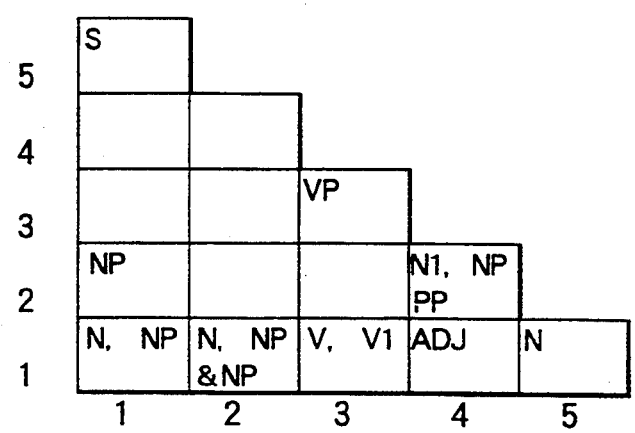
FIGS. 10A and 10B are diagrams showing reduced phrase structure analysis tables.
Figure 10:
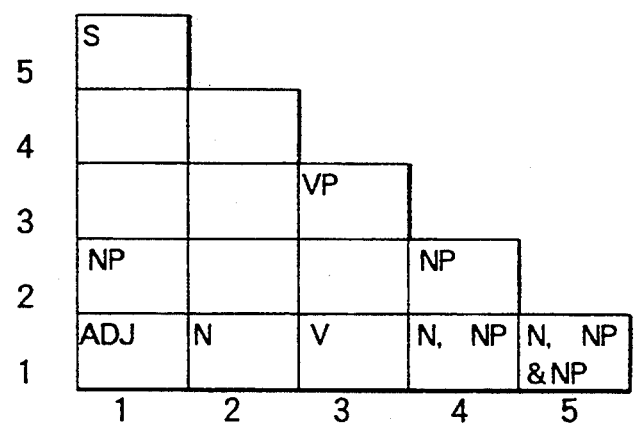

FIGS. 9A and 10A respectively show examples of a reduced word table and a reduced phrase structure analysis table obtained by achieving the post-processing on the word table of FIG. 7A and the phrase structure analysis table of FIG. 8A, respectively. The items of the tables of FIGS. 9A and 9B are the same as those of FIGS. 7A and 7B. As can be seen from the example of FIG. 9A, there are missing the function words, namely, only the contents words are stored in the table. Moreover, In the table of FIG. 10A, a plurality of elements in the table of FIG. 8A of which the corresponding content words form an identical set are merged into an element.

Figure 11:
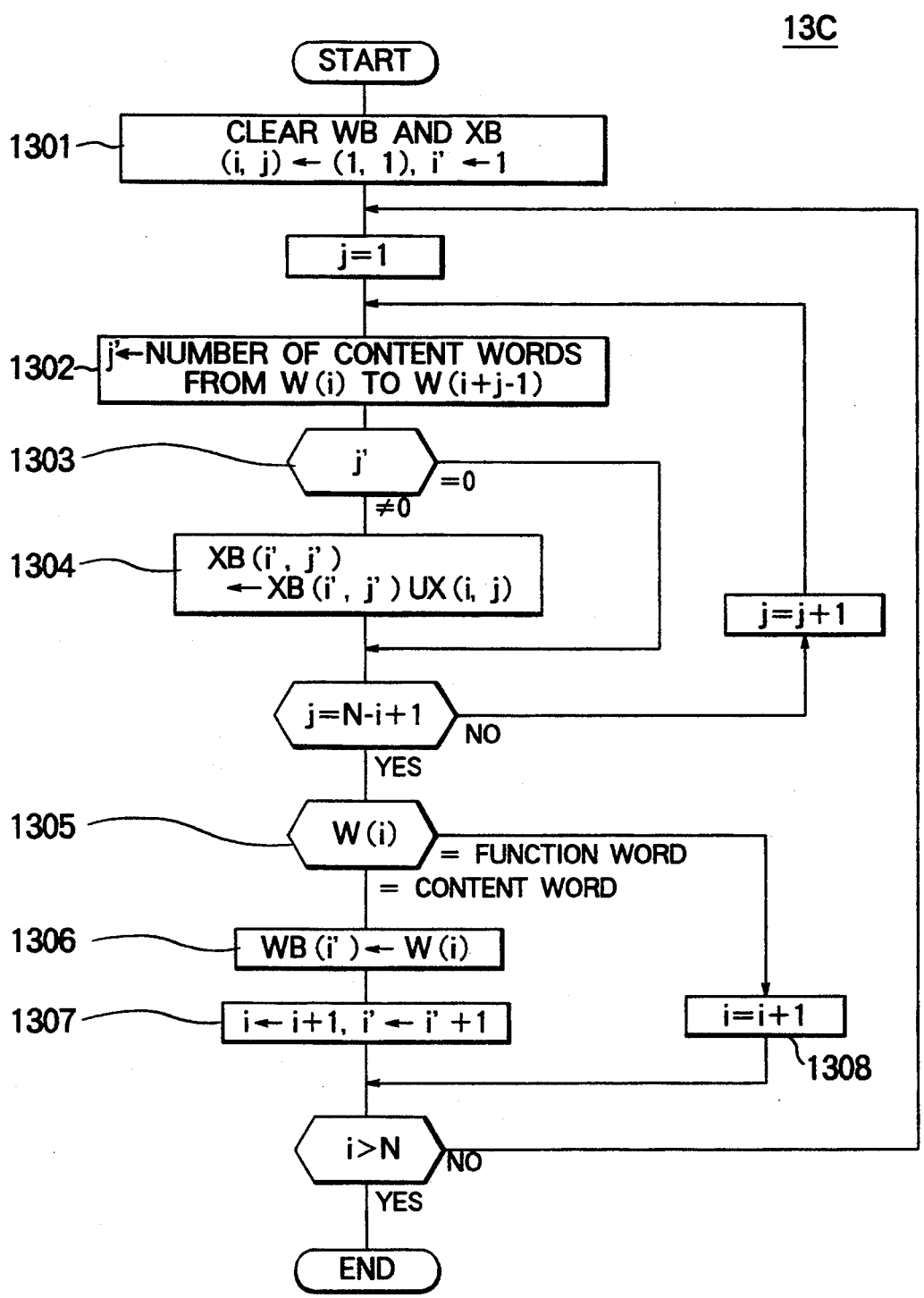
FIG. 11 is a flowchart showing processing of a postprocessing sub-step in a translated sentence analysis step.

FIG. 11 shows a detailed flowchart of the processing executed in the post-processing sub-step 13c of FIG. 6. In the flowchart, letters W, WB, X, and XB respectively stand for the word table, the reduced word table, the phrase structure analysis table, and the reduced phrase structure analysis table. Furthermore, (i,j) denotes an index indicating an element of the phrase structure analysis table; whereas, (i',j') designates an index indicating an element of the reduced phrase structure analysis table. In addition, N is a variable for storing the number of words contained in the translated sentence and is determined by the processing of the sub-step 13a.

First, the system accesses the areas respectively of the tables WB and XB to clear the contents thereof and then (i,j) is initialized to (1,1) and i' is set to the initial value "1" (step 1301). For each value of j from j=1 to j=N−i+1, the system executes processing of steps 1302 to 1304.

Namely, by reference to the table W, the number of content words is counted in the i-th through (i+j−1)-th words to set the obtained number to j' (step 1302). Thereafter, the contents of the element (i,j) of the table X are added to the element (i',j') of the table XB (step 1304). However, the processing is skipped when no content word is included in the i-th through (i+j−1)-th words (step 1303). The processing of the steps 1302 to 1304 is executed in the range from j=1 to j=N−i+1.

Subsequently, referring to the table W, whether the i-th word of the translated sentence is a content word C or a function word F (step 1305) is examined. If the i-th words is a content word, the i-th element of the table W is stored in the i'-th element of the table WB of FIG. 9A and then one is added to each value of i and i' (step 1307). Otherwise, one is added only to the value of i (step 1308). Until the value of i exceeds N, the processing of the steps 1302 to 1308 is repeatedly executed.

The step 14 of FIG. 6 is the same as the step 13 thereof. As a result, there are obtained a word table and a phrase structure analysis table for the second translated sentence 344 "Typical devices include a maser and a laser" as well as a reduced word table and a reduced phrase structure analysis table developed by conducting the post-processing on the word table and the phrase structure analysis table. FIGS. 7B, 8B, 9B, and 10B respectively show the word table, the phrase structure analysis table, the reduced word table, and the reduced phrase structure analysis table obtained for the example of the second translated sentence "Typical devices include a maser and a laser".

The coupling step 15 of FIG. 6 is constituted of two sub-steps, namely, a word coupling sub-step 15a and a phrase coupling sub-step 15b, which will be described later. In the sub-step 15a, there is determined correspondence between words of the first translated sentence 343 and those of the second translated sentence 344. In the subsequent sub-step 15b, there is decided correspondence between phrases of the first translated sentence 343 and those of the second translated sentence 344. Results of the coupling operations are represented in a word/phrase correspondence table of FIG. 12.

Figures 12, 13A, 13B:
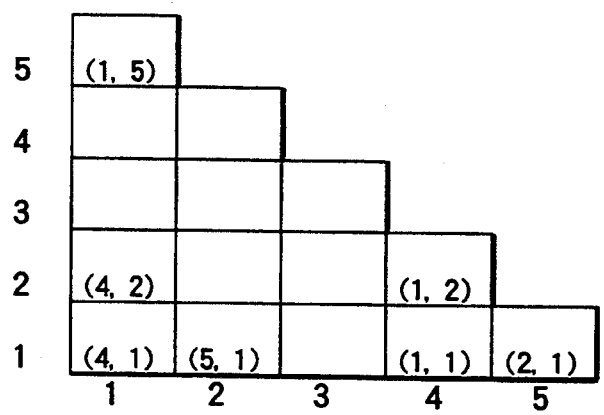
FIG. 12 is a diagram showing a phrase/word correspondence table.
FIGS. 13A and 13B are diagrams showing a word synonymity table and a coupling flag table, respectively.

The table of FIG. 12 is formed in a triangular matrix of which the size is equal to that of the reduced phrase structure analysis table of the second translated sentence. In an element of the matrix, there is written an empty indication or at least an index denoting an element of the reduced phrase structure analysis table of the first translated sentence. When any ambiguity exists in the word/phrase correspondence, a plurality of indices are written in the pertinent element. In a case where there is established a correspondence between a phrase constituted of content words from the i-th word to the (i+j−1)-th word of the second translated sentence and one formed of content words from the m-th word to the (m+n−1)-th word of the first translated sentence, the value of (m,n) is written in the element (i,j) of the word/phrase correspondence table.

For example, through comparison between the portions of FIGS. 9A and 9B, it can be recognized that "maser" in the first translated sentence listed as the first item in FIG. 9A matches "maser" in the second translated sentence shown as the fourth item in FIG. 9B. Consequently, in the element (1,1) of the table of FIG. 12, there is written (4,1) denoting the one-word long fourth item "maser" of the second translated sentence of FIG. 9B. In this connection, since the third item "cite" of the first translated sentence of FIG. 9A has no counterpart in the second translated sentence of FIG. 9B, an empty indication is written in the element (1,3).

In the step 15, a word synonymity table of FIG. 13A is generated together with the word correspondence table of FIG. 12. The synonymity table includes elements corresponding to the respective content words of the second translated sentence. Namely, in the i-th element thereof, there is written synonymity between the i-th content word of the sentence and a content word of the first translated sentence coupled therewith. In this regard, when the content word corresponding to the i-th content word of the second translated sentence is missing in the first translated sentence or when the coupled content words are not synonymous with each other, a value "0.0" is set as the synonymity. In addition, in the processing of the step 15, there is used a coupling flag table of FIG. 13B. The table includes flags corresponding to the content words of the first translated sentence. In this table, only when a correspondence is established between the m-th content word of the first translated sentence and a content word of the second translated sentence, a value "1" is set to the m-th flag.

Figure 14:
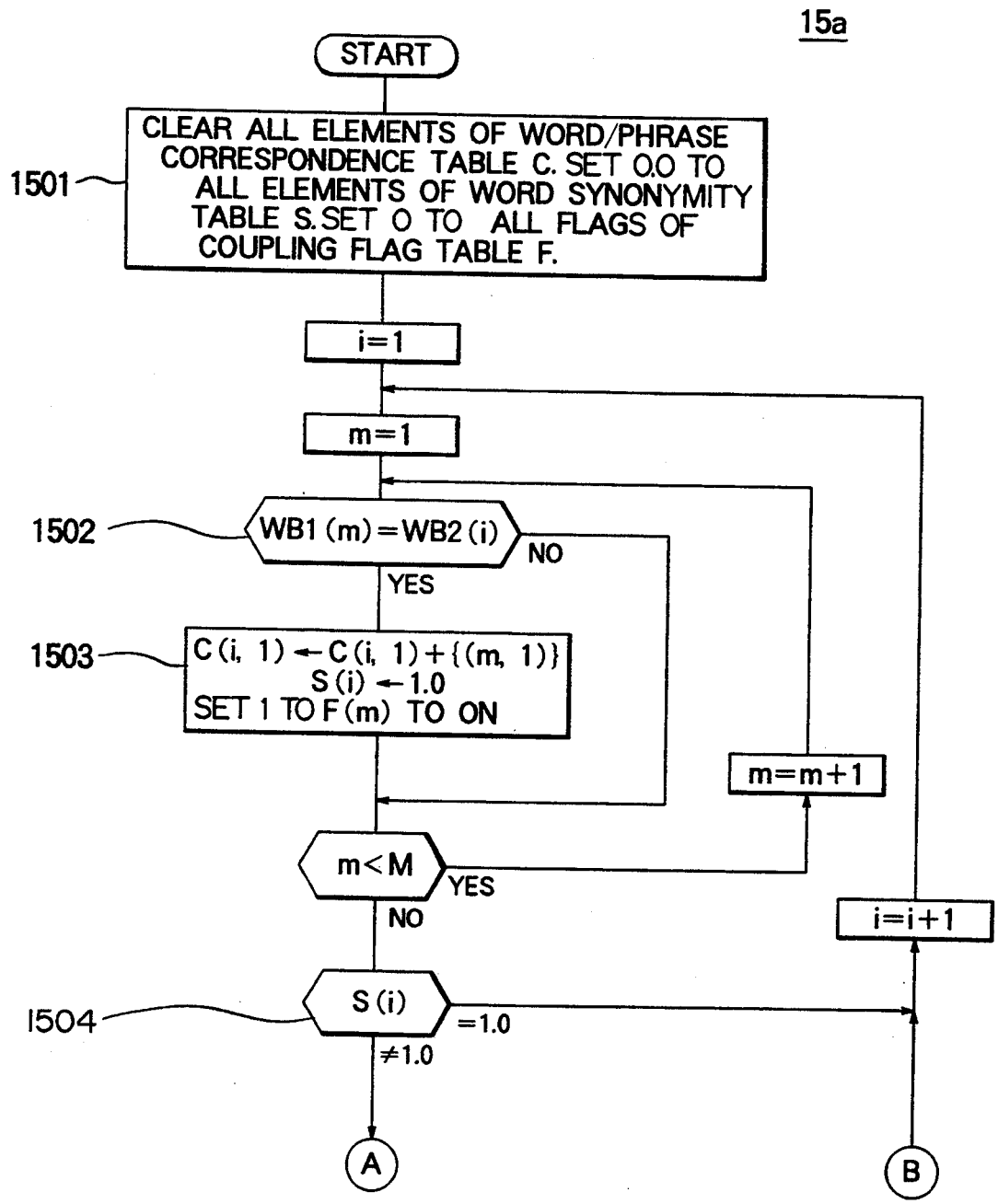
FIG. 14 is a flowchart (section 1) showing processing of a word coupling sub-step of a word/phrase coupling step.
Figure 15:
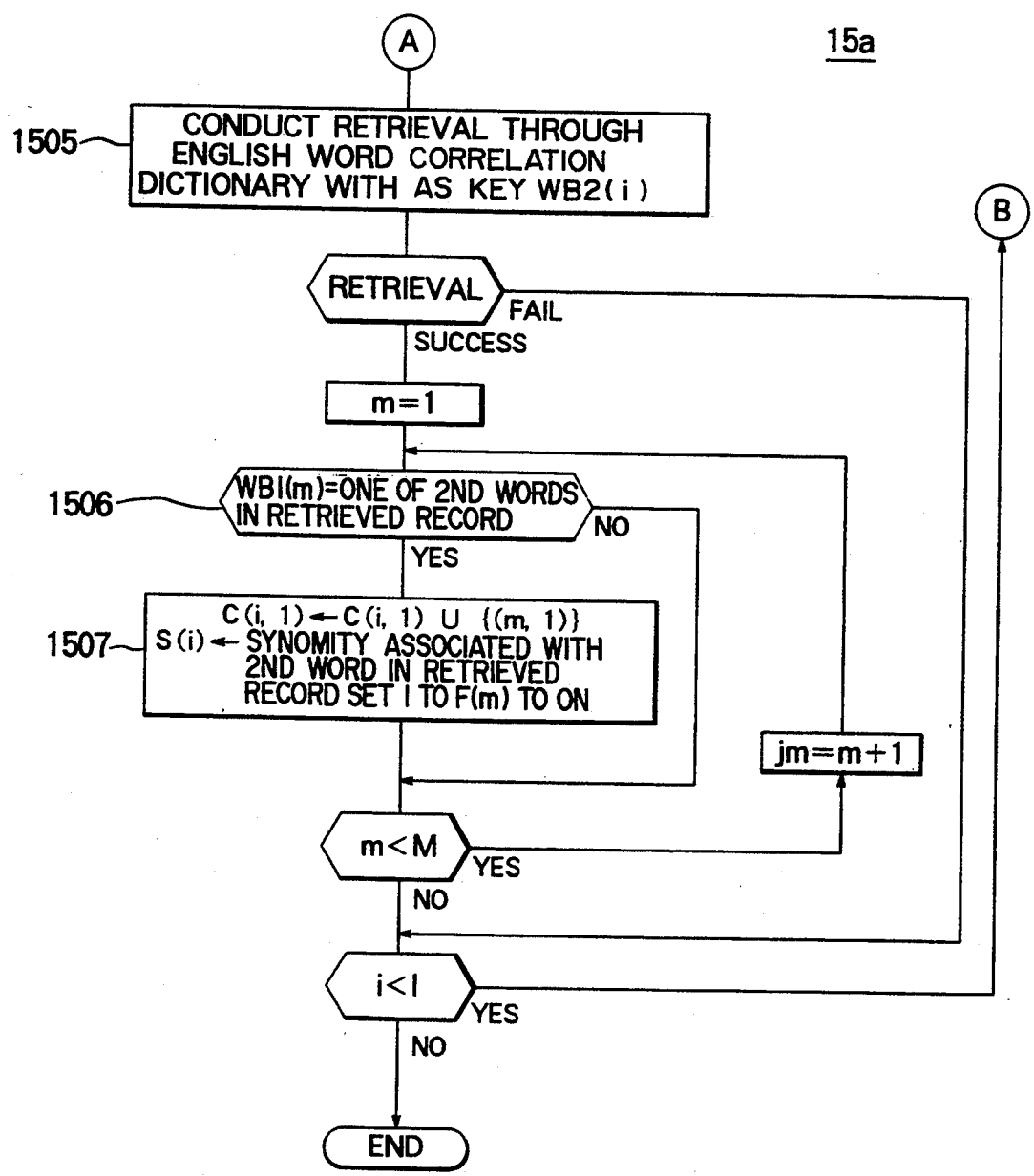
FIG. 15 is a flowchart (section 2) showing processing of the word coupling sub-step of the word/phrase coupling step.

FIGS. 14 and 15 are flowcharts showing processing of the word coupling sub-step 15a of FIG. 6. Reference symbols WB1 and WB2 stand for the reduced word tables for the first and second translated sentences respectively. Moreover, letters M and I respectively denote numbers of elements of the tables for the first and second translated sentences, and m and i respectively designate indices indicating content words respectively of the first and second translated sentences. In addition, symbols C, S, and F denote the word/phrase correspondence table, the word synonymity table, and the coupling flag table, respectively.

First, a empty set indication item is set to each element of the table C of FIG. 12, a value "0.0" is set to each element of the table S of FIG. 13A, and "0" is set to each flag of the table F of FIG. 13B (step 1501). Thereafter, for each content word of the second translated sentence, processing of steps 1502 to 1507 is carried out.

A check is then made to decide whether or not the table WB1 of FIG. 9A contains a content word identical to the i-th content word of the table WB2 of FIG. 9B (step 1502). If the m-th content word of the table WB1 is identical to the i-th content word of the table WB2, (m,1) is added to the element (i,1) of the table C, "1.0" is set as the value of the i-th element of the table S, and "1" is set to the m-th flag of the table F (step 1503). Otherwise, the processing of steps 1504 and 1505 is conducted to achieve a retrieval through the English word correlation dictionary 33 of FIG. 4 with the i-th content word of the table WB2 of FIG. 9B set as a retrieval key (step 1505). When a record is obtained from the dictionary 33 for the i-th content word, the processing of steps 1506 and 1507 is executed.

In short, a check is made to decide whether or not the table WB1 of FIG. 9A contains a content word identical to any second word 332 of the retrieved record (step 1506). When this is the case, (m,1) is added to the element (i,1) of the table C, the synonymity 333 associated with the second word 332 of the record is written in the i-th element of the table S, and "1" is set to the m-th flag of the table F (step 1507).

Figure 16:
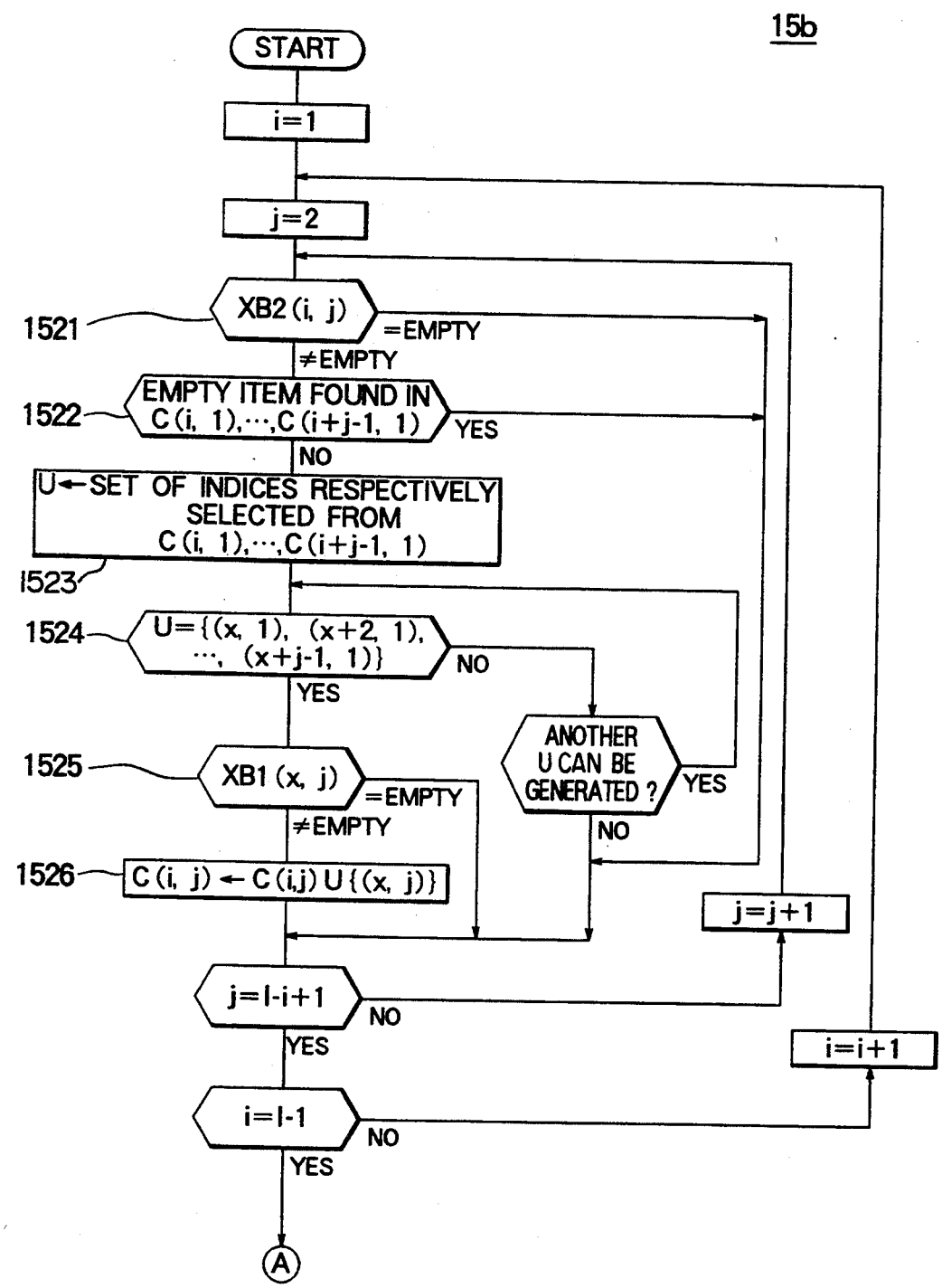
FIG. 16 is a flowchart (section 1) showing processing of a phrase coupling sub-step of the word/phrase coupling step.
Figure 17:
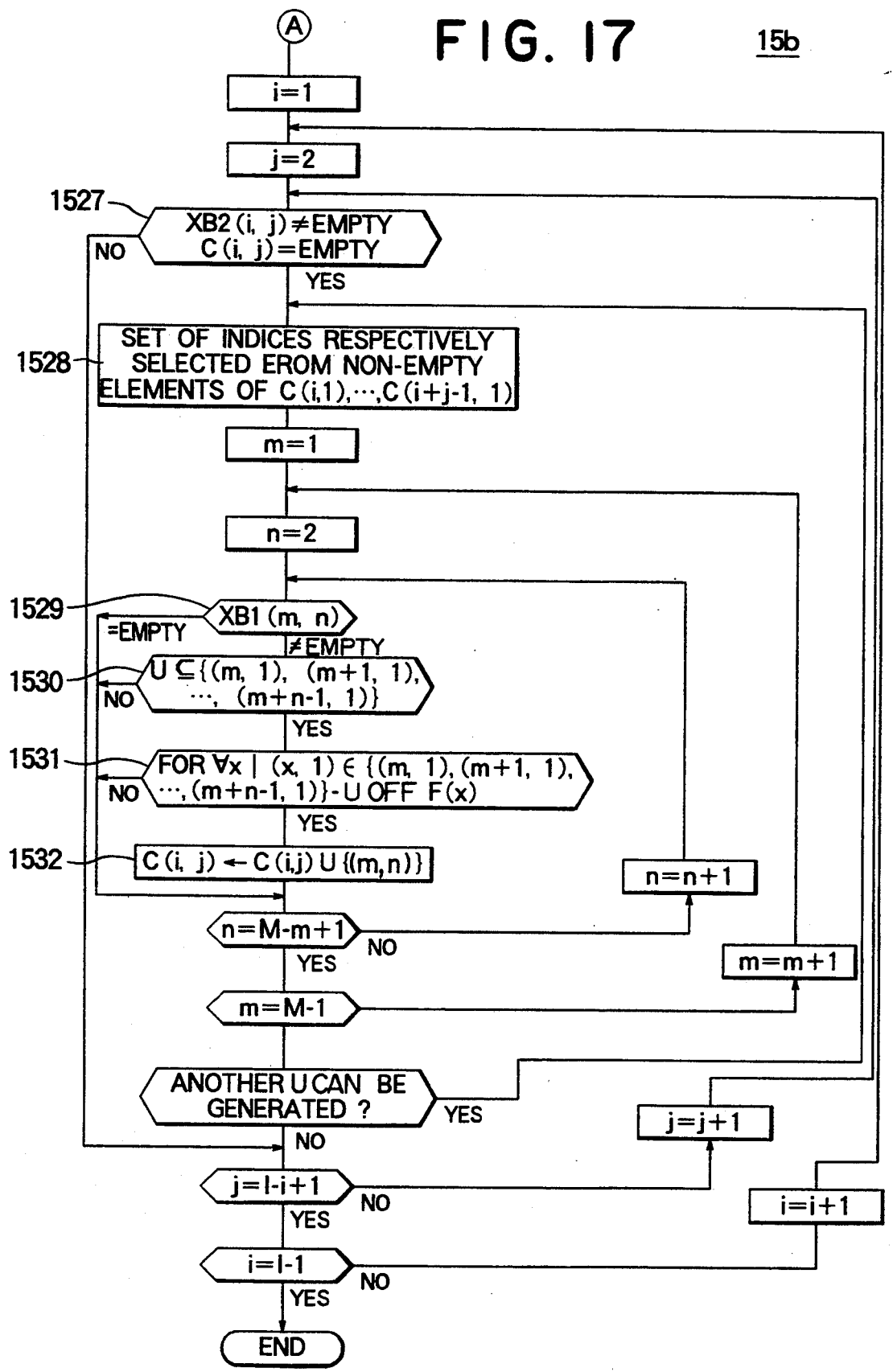
FIG. 17 is a flowchart (section 2) showing processing of the phrase coupling sub,step of the word/phrase coupling step.

FIGS. 16 and 17 are flowcharts showing the operation of the phrase coupling sub-step 15b of FIG. 6. Symbols XB1 and XB2 denote the reduced phrase structure analysis tables for the first and second translated sentences respectively. Items (m,n) and (i,j) are indices respectively denoting elements of the reduced phrase structure analysis tables for the first and second translated sentences. Letters M and I stand for numbers of elements of the first and second reduced word tables, respectively. Symbols C and F denotes the word/phrase corresponding table and the coupling flag table, respectively.

First, an element (i,j) is obtained from the table XB2 of FIG. 10A (i=1, ..., I−1; j=2, ..., I−i+1) to execute processing of steps 1521 to 1526 for the element. Namely, a check is made to determine whether or not the element XB2 (i,j) is empty (step 1521). If this is not the case, a check is made to decide whether or not there exists any empty element in the elements ranging from an element C (i,1) to an element C (i+j−1, 1) of FIG. 12 (step 1522). If there does not exist such an empty element, a selection is conducted to obtain from each of the elements an index indicating an element of the table XB1 of FIG. 10A, thereby creating a set of indices U (step 1523).

If the set U represents a set of consecutive elements of the table of XB1 FIG. 10A, namely, if U={(x,1),(x+2, 1), ..., (x+j−1, 1)}, a check is further achieved to determine whether or not the element (x,j) of the table XB1 of FIG. 10A is empty (step 1525). If this is not the case, (x,j) is additionally written in the element (i,j) of the table C (step 1526).

Subsequently, an element (i,j) is attained from the table XB2 of FIG. 10B (i=1, ..., I−1; j=2, ..., I−i+1) to conduct processing of steps 1527 to 1532. A check is made to decide the following condition, namely, the element (i,j) of the table XB2 of FIG. 10B is not empty and the element (i,j) of the table C of FIG. 12 is empty (step 1527). If the element (i,j) of the table XB2 is not empty and the element (i,j) of the table C is empty, a selection is made to obtain, from each non-empty element among the elements (i,1) to (i+j−1, 1) of the table C, an index indicating an element of the table XB1 of FIG. 10A so as to generate a set of indices U (step 1528); thereafter, processing of steps 1529 to 1532 is executed.

An element (m,n) is obtained from the table XB1 of FIG. 10A (m=1, ..., M−1; n=2, ..., M−m+1) to determine that the element XB1 (m,n) is not empty (step 1529), that the set U is a sub-set of {(m,1), (M+1, 1), .., (m+n−1, 1)} (step 1530), and that the x-th flag of the coupling flag table is off for the element (x,1) of {(m,1), (M+1, 1), ..., (m+n−1, 1)}-U (step 1531). When all conditions of the steps 1529 to 1531 are satisfied, (m,n) is additionally written in the element (i,j) of the word/phrase correspondence table C (step 1532).

In the similarity computing step 16 of FIG. 6, by reference to the reduced phrase structure analysis tables of FIGS. 10A and 10B, the word/phrase correspondence table of FIG. 12, and the word synonymity table of FIG. 13A, there is calculated similarity of the first translated sentence 343 with respect to the second translated sentence 344. Moreover, in this processing, a phrase's weight table and a demerit mark table are referenced. The phrase's weight table contains, as shown in FIG. 18, degree of contribution to similarity of the translated sentences for each phrase marker. In the demerit mark table, as shown in FIG. 19, there is defined a demerit point relative to the similarity (maximum value is 1.0) for each difference features (supplementary information written in the phrase structure analysis tables) of phrases of the first and second translated sentences.

Figure 20:
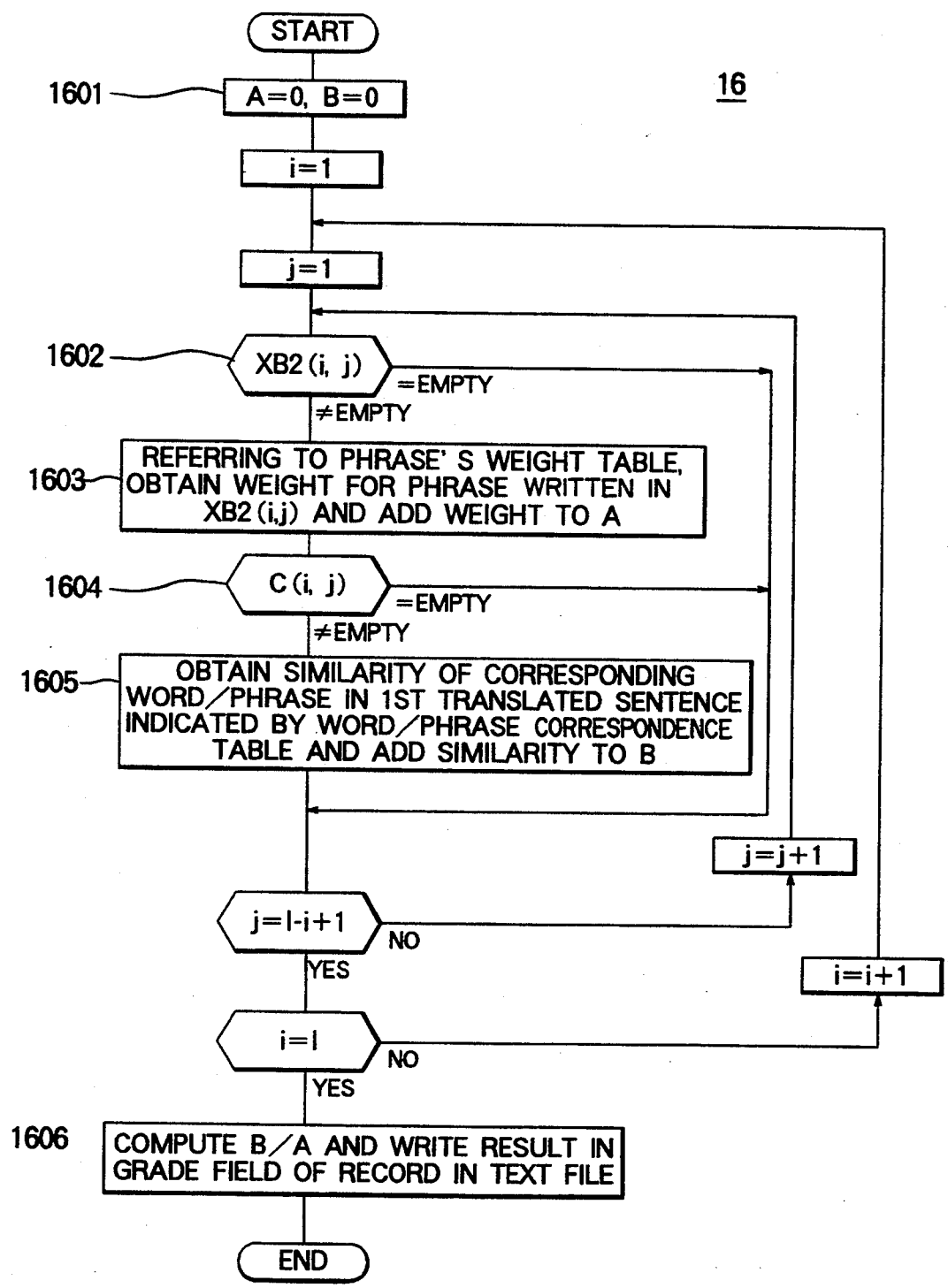
FIG. 20 is a flowchart showing processing of a similarity calculation step.

FIG. 20 is a flowchart showing the processing of the step 16. Reference symbols XB1 and XB2 respectively denote the reduced phrase structure analysis tables for the first and second translated sentences and a letter C designates a word/phrase correspondence table. Moreover, (i,j) is an index indicating an element of the table XB2 and a letter I denotes the number of content words of the second translated sentence. In addition, a letter A designates a variable to store therein an accumulated value of phrase's weight and a letter B stands for a variable to store therein an accumulated value of similarity of corresponding phrases between the first and second translated sentences.

First, the variables A and B are each initialized to "0" (step 1601) and then processing of steps 1602 to 1605 is conducted for each value of (i,j), where i=1, ..., I and j=1, ..., I−i+1.

A check is made to determine whether or not the element (i,j) of the table XB2 of FIG. 10B is empty (step 1602). If this is the case, the processing of the pertinent element (i,j) is finished. Otherwise, by reference to phrase's the weight table of FIG. 18, there is obtained the weight of the phrase written in the element (i,j) of the table XB2 of FIG. 10B so as to add the value to the variable A (step 1603). In this situation, when a plurality of phrase markers are written in the element of the table XB2, the phrase marker having the maximum weight value is selected therefrom. Next, a check is made to decide whether or not the element (i,j) of the word/phrase correspondence table of FIG. 12 is empty (step 1604). If this is the case, the processing of the pertinent element (i,j) is finished.

If the element (i,j) of the table C is not empty, similarity is obtained between the phrase of the second translated sentence indicated by the element (i,j) of the table C of FIG. 12 and the phrase of the first translated sentence associated therewith, thereby adding the value to the variable B (step 1605). In short, assuming that an index (m,n) is written in the element (i,j) of the table C of FIG. 12, supplementary information of the phrase written in the element (i,j) of the table XB2 of FIG. 10B is compared with that of the phrase written in the element (m,n) of the table XB1 of FIG. 10A. Referring to the demerit mark table of FIG. 19 based on the discrepancy therebetween, obtained demerit values are subtracted from the value "1". When the result becomes to be negative, "0" is assigned thereto, namely, the subtraction is not conducted. The resultant value is multiplied by a weight of the pertinent phrase so as to add the obtained value to the variable B. In this connection, when a plurality of indices are written in the element (i,j) of the word/phrase correspondence table C, the index leading to the maximum value is utilized.

After the processing of steps 1602 to 1605 is completed for all elements (i,j), a value of B/A is calculated and is written in the grade field 345 of the record in the text file.34 of FIG. 5 (step 1606).

Figures 21, 22:
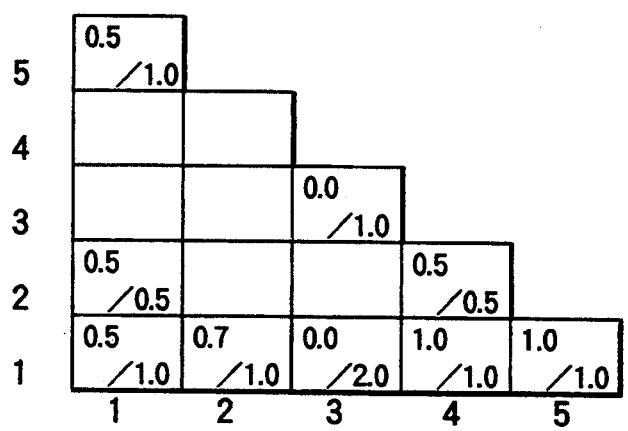
FIG. 21 is a diagram useful to explain an example of calculation for similarity between translated sentences.
FIG. 22 is a diagram showing an example of an evaluation result display screen.

FIG. 21 shows a specific example of calculation of similarity in which weights and grades are presented for corresponding phrases between the first translated sentence "A maser and a laser are cited as a representative device." and the second translated sentence "Typical devices include a maser and a laser." The elements of the triangular matrix of FIG. 21 correspond to the respective phrases of the second translated sentence. For each element, the denominator and the numerator indicate a weight and similarity between phrases, respectively. Meanings of the numeric values of FIG. 21 can be understood in association with the word/phrase correspondence table of FIG. 12 and the reduced phrase structure analysis tables of FIGS. 10A and 10B. As a total of values of FIG. 21, there is attained a grade of 0.52 as similarity between the first and second translated sentences. The value "0.52" is stored in the text file as shown in FIG. 5.

In the evaluation result displaying step 17 of FIG. 6, the grade of similarity between the first and second translated sentences is displayed on the display device 5 together with the original sentence, the first translated sentence, and the second translated sentence. FIG. 22 shows a concrete example of the display screen.

Figure 23:
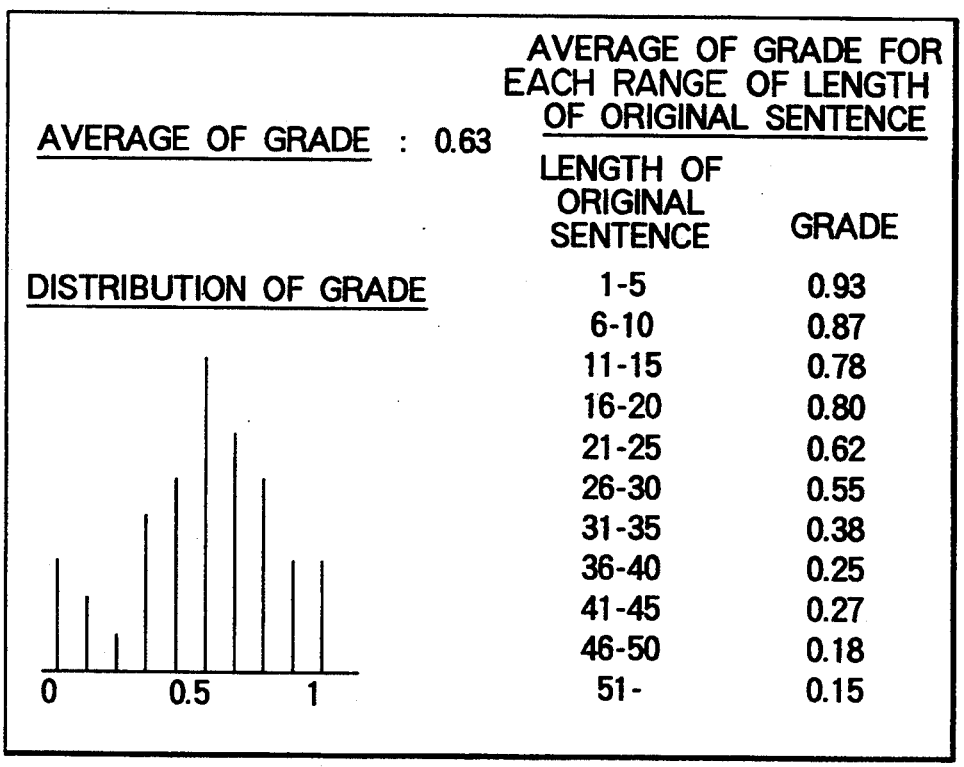
FIG. 23 is a diagram showing an example of an evaluation result summarizing and displaying screen.

After the steps 11a to 17 of FIG. 6 are executed for all bilingual pairs of sentences read from the text file 34, an evaluation result summarizing and displaying step 18 is carried out to compute summary data of evaluation results for all sentences of the text file 34, thereby displaying the summary data on the display 5. The data thus presented include, as shown in FIG. 23, such items as an average and a distribution of grades related to similarity between the first and second translated sentences and/or an average of grades for each range of length of original sentence.

Description has been given of a Japanese-English machine translation system as an embodiment of the machine translation system according to the present invention.

The present invention, however, is not restricted by the embodiment above. For example, data is partially duplicated between the dictionaries 31 and 32 in this embodiment. The dictionaries 31 to 33 may be modified not to have any duplication of data therebetween to configure another embodiment according to the present invention. That is, the present invention can be implemented only if the necessary dictionary information is available in the machine translation step 12, the translated sentence analysis steps 13 and 14, and the word/phrase coupling step 15.

In the embodiment, the synonymity of words to be stored in the dictionary 33 takes only two levels, namely, "0.5" for a synonym and "0.0" for a different meaning word. However, the synonymity may be represented in many levels so as to resultantly achieve a finer evaluation of the lexical similarity between translated sentences.

In the embodiment above, the machine translation is accomplished from Japanese sentences into English sentences. However, in a translation between two languages which are syntactically quite similar to each other, for example, in a machine translation from English sentences into German sentences, the present invention can be implemented without using the syntactic analysis sub-step 13b disposed in the analysis steps 13 and 14 of FIG. 6.

Figure 24:
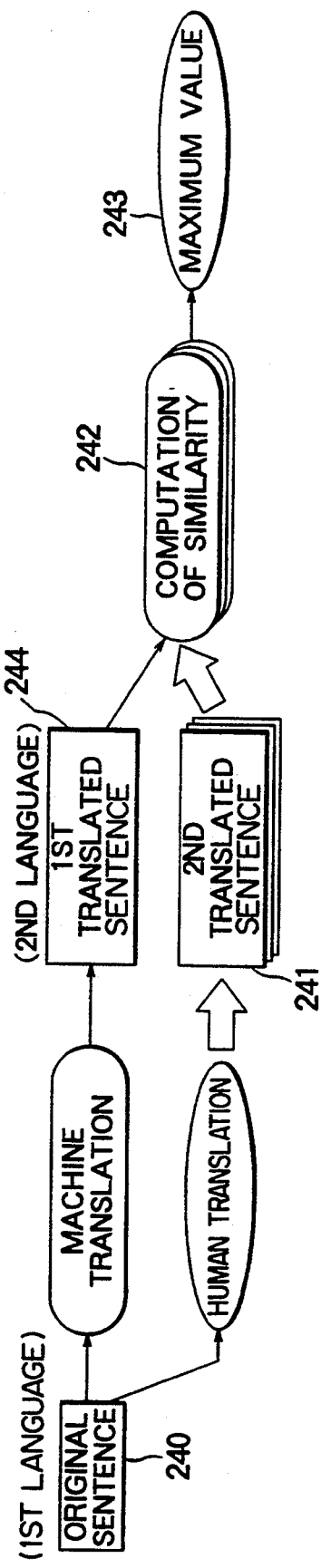
FIG. 24 is a diagram for explaining an embodiment in which a first translated sentence is compared with a plurality of second translated sentences.

In the embodiment above, a second translated sentence is prepared for an original sentence. However, for an original sentence 240, there may be usually considered a plurality of exemplary translated sentences. As shown in FIG. 24, there may be disposed a plurality of second translated sentences 241 such that a first translated sentence 244 obtained for the original sentence 241 through the machine translation is compared with the respective second translated sentences 241 to calculate similarity 242 for each pair thereof, thereby adopting the maximum value 243 of similarity as the grade of the first translated sentence 244.

Figure 25:
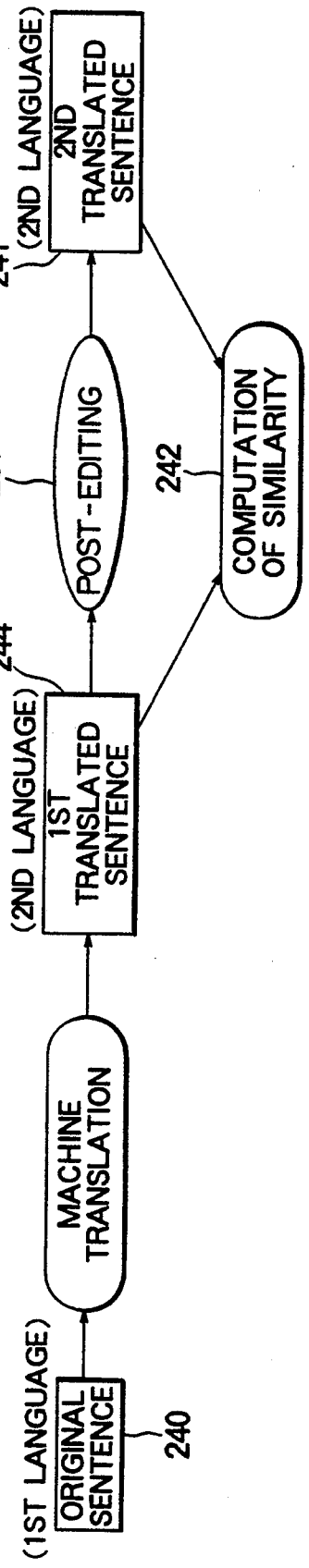
FIG. 25 is a diagram useful to explain an embodiment in which a sentence resulted by editing a first translated sentence is employed as a second translated sentence.

In the description of the embodiment above, the second translated sentences are inputted together with the original sentence in the machine translation system. However, as shown in FIG. 25, to implement the present invention, the first translated sentence 244 generated from the machine translation system may be post-edited (251) by a human operator to employ the obtained sentence as the second translated sentence 241. In the system processing of such a case, only the original sentence 240 is read in the step 11 of FIG.6 and there is disposed between the steps 12 and 13 a step to read the translated sentence post-edited (251) by the operator.

The embodiment described above is a machine translation system in which the function to evaluate translated sentences is incorporated. However, there may be constructed an apparatus to evaluate a machine translation system, the apparatus being separated from the system. The apparatus can be developed by combining a text read function to read the first and second translated sentences and a translated sentence evaluating function to compute similarity between a first translated sentence and a second translated sentence associated therewith.

Figure 26:
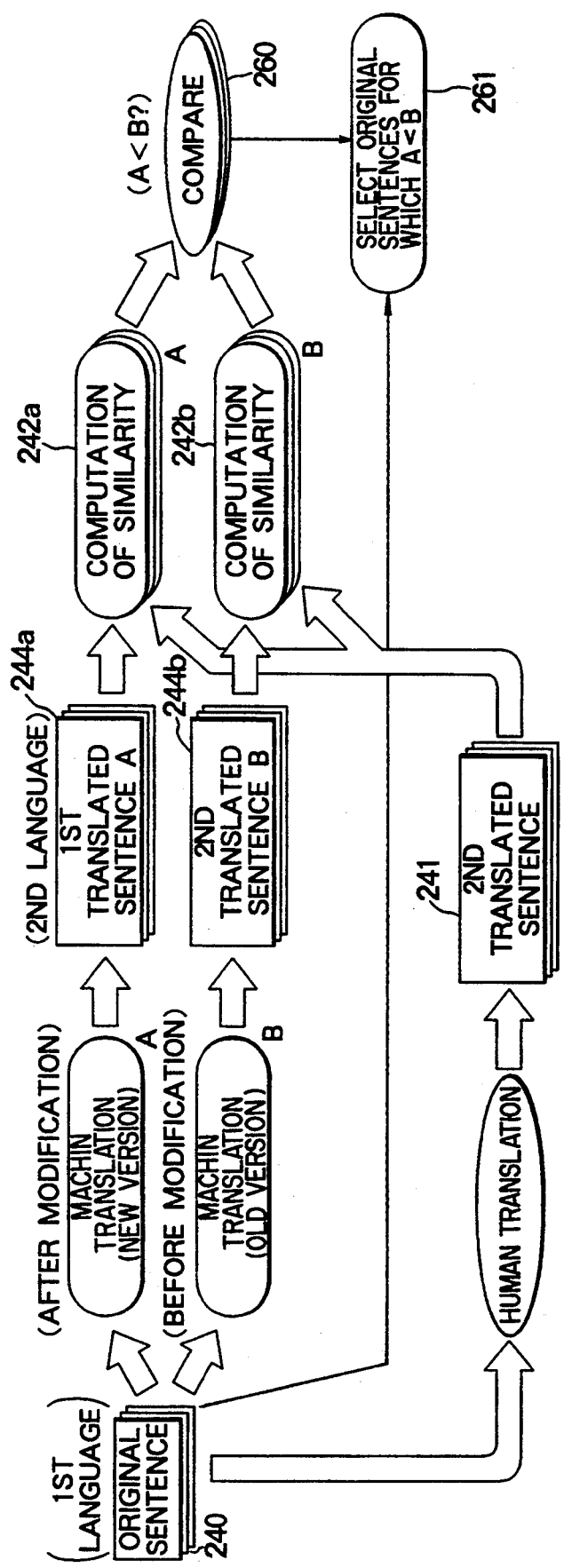
FIG. 26 is a diagram for explaining an embodiment for evaluating a machine translation system before and after modification thereof by use of a plurality of original sentences.

In addition, applying the translated sentence evaluating method according to the present invention to a set of test sentences, it is possible to conduct a comparison between machine translation systems of different versions before and after modifications thereof or between a new machine translation system and an old machine translation system. In other words, as shown in FIG. 26, for an original sentence 240, similarity values 242a and 242b are respectively computed with respect to a first translated sentence (A) 244a generated from a new machine translation system after modification and one (B) 244b produced from an old machine translation system before modification. From a plurality of original sentences 240, there is selected (261) an original sentence of which the similarity 242a is lower than the similarity 242b, thereby displaying the selected original sentence, the associated two first translated sentences (A) and (B), and the second translated sentence. As a result, it is possible to extract the sentence patterns which cannot be appropriately processed when the machine translation system is modified or updated.

The phrase's weight table of FIG. 18 and the demerit mark table of FIG. 19 are shown only by way of example and hence the contents thereof are not restricted by those values.

According to the present invention, there is obtained an advantage that only by preparing a bilingual pair of sentences indicating a favorable or desirable translation sentence for an original sentence, the quality of the sentence created from the machine translation system can be automatically and objectively evaluated. In addition, the engineers developing a machine translation system can easily recognize the progress of development; moreover, by preparing typical translation texts in a field to which the user desires to apply the system, it is easily decided whether or not the application of the machine translation system to the field is favorable or whether or not a satisfactory utilization effect is accordingly obtained. Furthermore, executing in a plurality of machine translation systems translation of identical texts used in a field, there can be selected a machine translation system most suitably applied to the field.

While particular embodiments of the invention have been shown and described, it will be obvious to those skilled in the art that various changes and modifications may be made without departing from the present invention in its broader aspects.

I claim:

1. An apparatus for evaluating translated sentences for a machine translation system, comprising:

first translated sentence analyzing means for achieving a morphological analysis and a syntactic analysis on a first, machine translated sentence in a second language obtained by translating an original sentence in a first language by the machine translation system;

second translated sentence analyzing means for conducting a morphological analysis and a syntactic analysis on a second, human translated sentence in the second language the second human translated sentence being humanly translated from the original sentence and inputted by an input device;

coupling means for coupling words and phrases between the first and second translated sentences according to the results of the first and second translated sentence analyzing means; and similarity computing means for computing, based on the result of the coupling means, lexical and syntactic similarity between the first and second translated sentences.

2. An apparatus for evaluating translated sentences for a machine translation system, comprising:
- first translated sentence analyzing means for achieving a morphological analysis on a first translated sentence in a second language obtained by translating an original sentence in a first language by the machine translation system;
- second translated sentence analyzing means for conducting a morphological analysis on a second translated sentence in the second language previously human translated from the original sentence;
- an input device for converting the second, human translated sentence into an electronic format, the input means being connected with the second sentence analyzing means for supplying the second sentence thereto in the electronic format;
- word coupling means for coupling words between the first and second translated sentences in accordance with results of the first and second translated sentence analyzing means; and
- similarity computing means for computing, based on the result of the word coupling means, lexical similarity between the first and second translated sentences.

3. In a machine translation system including an input device, an output device and a memory wherein said system translates a sentence in a first language to a sentence in a second language, a method of evaluating a translated sentence by comparing a machine translation sentence produced by said machine translation system with a standard translation sentence inputted from said input device, comprising steps of:
- storing a second language dictionary including a part of speech and an inflection pattern of a second language word, and a second language word correlation dictionary including synonyms for the second language word and synonymity degrees of each of said synonyms with said second language word, in said memory;
- extracting constituent words for said machine translation sentence based on morphological analysis of said machine translation sentence by referencing said second language dictionary;
- extracting phrases included in said machine translation sentence based on syntactic analysis of said machine translation sentence;
- extracting constituent words for said standard translation sentence based on morphological analysis of said standard translation sentence by referencing said second language dictionary;
- extracting phrases included in said standard translation sentence based on a syntactic analysis of said standard translation sentence;
- obtaining a first correspondence between a plurality of said extracted constituent words for said machine translation sentence and a plurality of said extracted constituent words for said standard translation sentence in accordance with synonymities by referencing said second language word correlation dictionary;
- obtaining a second correspondence between a plurality of said extracted phrases from said machine translation sentence and a plurality of said extracted phrases from said standard translation sentence in accordance with the first correspondence such that a pair of corresponding words is included within each pair of corresponding phrases;
- computing a consolidated evaluation value concerning similarity of words and phrases, in accordance with said first and second correspondences; and
- providing said consolidated evaluation value to said output device.

4. The method of evaluating the translated sentence in accordance with claim 3, wherein said computing step further comprising the steps of:
- computing, by referencing predetermined evaluation rules, a first evaluation value concerning similarities of said extracted words from said machine translation sentence with said extracted words from said standard translation sentence, in accordance with said first correspondence;
- computing, by referencing predetermined evaluation rules, a second evaluation value concerning similarities of said extracted phrases from said machine translation sentence with said extracted phrases from said standard translation sentence, in accordance with said second correspondence; and
- computing, said consolidated evaluation value in accordance with said first and second evaluation values.

5. The method in accordance with claim 4 further comprising the steps of:
- inputting a plurality of standard translation sentences each of which corresponds to an original sentence, from said input device;
- computing said consolidated evaluation values for said machine translation sentence by comparing individual standard translation sentences with said machine translation sentence; and
- selecting a maximum value from said consolidated evaluation values as an evaluation value for said machine translation sentence.

6. In a machine translation system including an input device, an output device and a memory wherein said system translates a sentence in a first language to a sentence in a second language, a method of evaluating translated sentence by comparing a machine translation sentence produced by said machine translation system with a standard translation sentence inputted from said input device, comprising steps of:
- storing a second language dictionary including a part of speech and an inflection pattern of a second language word, and a second language word correlation dictionary including synonyms for the second language word and synonymity degrees of each of said synonyms with said second language word, in said memory;
- extracting constituent words for said machine translation sentence based on morphological analysis of said machine translation sentence by referencing said second language dictionary;
- extracting constituent words for said standard translation sentence based on morphological analysis of said standard translation sentence by referencing said second language dictionary;
- obtaining a correspondence between a plurality of said extracted constituent words for said machine translation sentence and a plurality of said extracted constituent words for said standard translation sentence based on synonymities by referencing said second language word correlation dictionary;
- computing, by referencing a predetermined evaluation rule, an evaluation value concerning similarities of said extracted words from said machine translation sentence and said extracted words from said standard translation sentence in accordance with said correspondence; and providing said evaluation value to said output device.

7. In a machine translation system including an input device, an output device and a memory wherein said system translates a sentence in a first language to a sentence in a second language, a method of evaluating a translated sentence by comparing a machine translation sentence produced by said machine translation system with a standard translation sentence, comprising the steps of:

storing a translation dictionary including a first language word and a second language word corresponding to said first language word, a second language dictionary including a part of speech and an inflection pattern of the second language word and a second language word correlation dictionary including synonyms for the second language word and synonymity degrees of each of said synonyms with said second language word, in said memory;

inputting a plurality of original sentences and said standard translation sentences each of which corresponds to individual original sentences;

producing machine translation sentences each corresponding to individual original sentences by referencing said translation dictionary;

extracting constituent words for individual said machine translation sentences based on morphological analysis of said machine translation sentences by referencing said second language dictionary;

extracting phrases included in individual machine translation sentences based on syntactic analysis of said machine translation sentences;

extracting constituent words for individual standard translation sentences based on morphological analysis of said standard sentences by referencing said second language dictionary;

extracting phrases included in said standard translation sentences based on syntactic analysis of said standard translation sentence;

obtaining a first set of correspondences each of which connects said extracted constituent words for individual machine translation sentences with said extracted constituent words for individual standard translation sentences based on synonymities by referencing said second language dictionary;

obtaining a second set of correspondences each of which connects said extracted phrases from individual machine translation sentences with said extracted phrases from individual standard translation sentences in accordance with the first set of correspondences so that a pair of corresponding words should be included within a pair of corresponding phrases;

computing evaluation values concerning similarities of words and phrases in accordance with said first and second set of correspondences;

computing at least an average value and a variance of said evaluation values and average evaluation values for each range of original sentence length; and providing at least said average value and said variance and said average evaluation values for each range of original sentence length, to said output device.

8. The method of claim 7 further comprising the steps of:

computing, by referencing predetermined evaluation rules, a first set of evaluation values concerning similarities of said extracted words from said machine translation sentences with said extracted words from said standard translation sentences, and a second set of evaluation values concerning similarities of said extracted phrases from said machine translation sentence with said extracted phrases from said standard translation sentences, in accordance with said first and second set of correspondences;

computing at least an average value, a variance of said first and second set of evaluation values and average evaluation values for each range of original sentence length;

providing at least said average value and said variance and said average evaluation values for each range of original sentence length, to said output device.

9. The method of claim 7 wherein said translating dictionary, said second language dictionary and said second language word correlation dictionary are combined into one dictionary.

10. A method of evaluating a machine translation system which translates an original sentence in a first language to a translation sentence in a second language, comprising the steps of:

inputting a first machine translation sentence which is produced by a first machine translation system in accordance with said original sentence, a second machine translation sentence which is produced by a second machine translation system in accordance with said original sentence, and a standard translation sentence corresponding to said original sentence, from an input device;

storing a second language dictionary including a part of speech and an inflection pattern of a second language word, and a second language word correlation dictionary including synonyms for the second language word and synonymity degrees of each of said synonyms with said second language word, in a memory;

extracting constituent words for said first machine translation sentence based on morphological analysis of said first machine translation sentence by referencing said second language dictionary;

extracting phrases included in said first machine translation sentence based on syntactic analysis of said first machine translation sentence;

extracting constituent words for said second machine translation sentence based on morphological analysis of said second machine translation sentence by referencing said second language dictionary;

extracting phrases included in said second machine translation sentence based on syntactic analysis of said second machine translation sentence;

extracting constituent words for said standard translation sentence based on morphological analysis of said standard translation sentence by referencing said second language dictionary;

extracting phrases included in said standard translation sentence based on syntactic analysis of said standard sentence;

obtaining a first correspondence between a plurality of said extracted constituent words for said first machine translation sentence and a plurality of said extracted constituent words for said standard translation sentence based on synonymities by referencing said second language word correlation dictionary;

obtaining a second correspondence between a plurality of said extracted phrases from said first machine translation sentence and a plurality of said extracted phrases from said standard translation sentence in accordance with the first correspondence so that a pair of corresponding words should be included within a pair of corresponding phrases;

computing, by referencing a predetermined evaluation rule, a first evaluation value concerning similarities of said extracted words from said first machine translation sentence with said extracted words from said standard translation sentence, and a second evaluation value concerning similarities of said extracted phrases from said first machine translation sentence with said extracted phrases from said standard translation sentence in accordance with said first and second correspondences;

obtaining a third correspondence between a plurality of said extracted constituent words for said second machine translation sentence and a plurality of said extracted constituent words for said standard translation sentence based on synonymities by referencing said second language word correlation dictionary;

obtaining a fourth correspondence between a plurality of said extracted phrases from said second machine translation sentence and a plurality of said extracted phrases from said standard translation sentence in accordance with the third correspondence so that a pair of corresponding words should be included within a pair of corresponding phrases;

computing, by referencing predetermined evaluation rules, a third evaluation value concerning similarities of a plurality of said extracted words from said second machine translation sentence with a plurality of said extracted words from said standard translation sentence, and a fourth evaluation value concerning similarities of a plurality of said extracted phrases from said second machine translation sentence with a plurality of said extracted phrases from said standard translation sentence in accordance with said third correspondences and said forth correspondences; and providing said original sentence to an output device, with corresponding said first machine translation sentence, said second machine translation sentence and said standard translation sentence when said first evaluation value and said third evaluation value are different from each other, or when said second evaluation value and said fourth evaluation value are different from each other.

11. A method of evaluating a machine translation system which translates an original sentence in a first language to a translated sentence in a second language, comprising a steps of:

inputting a first machine translation sentence which is produced by a first machine translation system in accordance with said original sentence, a second machine translation sentence which is produced by a second translation system in accordance with said original sentence, and a standard translation sentence corresponding to said original sentence, from an input device;

storing a second language dictionary including a part of speech and an inflection pattern of a second language word, and a second language word correlation dictionary including synonyms for the second language word and synonymity degrees of each of said synonyms with said second language word, in a memory;

extracting constituent words for said first machine translation sentence based on morphological analysis of said first machine translation sentence by referencing said second language dictionary;

extracting constituent words for said second machine translation sentence based on morphological analysis of said second machine translation sentence by referencing said second language dictionary;

extracting constituent words for said standard machine translation sentence based on morphological analysis of said second machine translation sentence by referencing said second language dictionary;

obtaining a first correspondence between a plurality of said extracting constituent words for said first machine translation sentence and a plurality of said extracted constituent words for said standard translation sentence based on synonymities by referencing said second language word correlation dictionary;

computing by referencing a predetermined evaluation rule, a first evaluation value concerning similarities of said extracted words from said extracted first machine translation sentence with said extracted words from said standard translation sentence;

obtaining a second correspondence between a plurality of said extracted constituent words for said first machine translation sentence and a plurality of said extracted constituent words for standard translation sentence based on synonymities by referencing said second language word correlation dictionary;

computing, by referencing a predetermined evaluation rule, a second evaluation value concerning similarities of said extracted words from said extracted first machine translation sentence with said extracted words from said standard translation sentence;

providing said original sentence to an output device, with corresponding said first machine translation sentence, said second machine translation sentence and said standard translation sentence when said first evaluation value and said second evaluation value are different from each other.

12. A machine translation system comprising:

an input device for converting sentences into an electronic format;

a machine translating means for machine translating a sentence in a first language received in the electronic format from the input device into a sentence in a second language;

an evaluating means for comparing the machine translated sentence from said machine translating means with a standard translated sentence in the second language inputted from said input device, said evaluating means including;

a memory for storing a second language dictionary including parts of speech and inflection patterns of second language words, and a second language word correlation dictionary including synonyms for each second language word and synonymity degrees of each of said synonyms with each second language word;

means for extracting constituent words from said machine translated sentence based on morphological analysis of said machine translation sentence by referencing said second language dictionary;
means for extracting phrases included in said machine translated sentence based on syntactic analysis of said machine translated sentence;
means for extracting constituent words for said standard translated sentence based on morphological analysis of said standard translated sentence by referencing said second language dictionary;
means for extracting phrases included in said standard translated sentence based on a syntactic analysis of said standard translated sentence;
means for obtaining a first correspondence between a plurality of said extracted constituent words for said machine translated sentence and a plurality of said extracted constituent words for said standard translated sentence in accordance with synonymities by referencing said second language word correlation dictionary;
means for obtaining a second correspondence between a plurality of said extracted phrases from said machine translated sentence and a plurality of said extracted phrases from said standard translated sentence in accordance with the first correspondence such that a pair of corresponding words is included within each pair of corresponding phrases;
means for computing a consolidated evaluation value concerning similarity of words and phrases, in accordance with said first and second correspondences; and
an output means for converting said consolidated evaluation value into a human readable display.

13. The machine translation system of claim 12 wherein the evaluating means further includes:
means for computing, by referencing predetermined evaluation rules stored in the memory, a first evaluation value concerning similarities of said extracted words from said machine translated sentence with said extracted words from said standard translated sentence, in accordance with said first correspondence;
means for computing, by referencing the predetermined evaluation rules, a second evaluation value concerning similarities of said extracted phrases from said machine translated sentence with said extracted phrases from said standard translation sentence, in accordance with said second correspondence; and
means for computing, said consolidated evaluation value in accordance with said first and second evaluation values.

14. The machine translation system of claim 12 wherein
the input means inputs a plurality of human translated sentences each of which corresponds to a common machine translated sentence and wherein the evaluating means includes;
means for computing a plurality of said consolidated evaluation values by comparing each of the human translated sentences with said machine translation sentence; and
means for selecting a maximum of the consolidation evaluation values.

15. An apparatus for evaluating translated sentence by comparing a machine translation sentence produced by machine translation system with a standard translation sentence inputted from an input device, the apparatus comprising:
a memory for storing a second language dictionary including a part of speech and an inflection pattern of a second language word, and a second language word correlation dictionary including synonyms for the second language word and synonymity degrees of each of said synonyms with said second language word, in said memory;
means for extracting constituent words for said machine translation sentence based on morphological analysis of said machine translation sentence by referencing said second language dictionary;
means for extracting constituent words for said standard translation sentence based on morphological analysis of said standard translation sentence by referencing said second language dictionary;
means for obtaining a correspondence between a plurality of said extracted constituent words for said machine translation sentence and a plurality of said extracted constituent words for said standard translation sentence based on synonymities by referencing said second language word correlation dictionary;
means for computing, by referencing a predetermined evaluation rule, an evaluation value concerning similarities of said extracted words from said machine translation sentence and said extracted words from said standard translation sentence in accordance with said correspondence; and
means for providing said evaluation value to an output device.

16. An apparatus for evaluating translated sentences by comparing a machine translation sentence produced by a machine translation system with a standard translation sentence, comprising:
a memory for storing a translation dictionary including a first language word and a second language word corresponding to said first language word, a second language dictionary including a part of speech and an inflection pattern of the second language word and a second language word correlation dictionary including synonyms for the second language word and synonymity degrees of each of said synonyms with said second language word;
means for inputting a plurality of original sentences and said standard translation sentences each of which corresponds to individual original sentences;
means for producing machine translation sentences each corresponding to individual original sentences by referencing said translation dictionary;
means for extracting constituent words for individual said machine translation sentences based on morphological analysis of said machine translation sentences by referencing said second language dictionary;
means for extracting phrases included in individual machine translation sentences based on syntactic analysis of said machine translation sentences;
means for extracting constituent words for individual standard translation sentences based on morphological analysis of said standard sentences by referencing said second language dictionary;
means for extracting phrases included in said standard translation sentences based on syntactic analysis of said standard translation sentence;
means for obtaining a first set of correspondences each of which connects said extracted constituent words for individual machine translation sentences with said extracted constituent words for individual standard translation sentences based on synonymities by referencing said second language dictionary;

means for obtaining a second set of correspondences each of which connects said extracted phrases from individual machine translation sentences with said extracted phrases from individual standard translation sentences in accordance with the first set of correspondences so that a pair of corresponding words should be included within a pair of corresponding phrases;

means for computing evaluation values concerning similarities of words and phrases in accordance with said first and second set of correspondences;

means for computing at least an average value and a variance of said evaluation values and average evaluation values for each range of original sentence length; and means for providing at least said average value and said variance and said average evaluation values for each range of original sentence length, to said output device.

17. The apparatus of claim 16 further comprising:

means for computing, by referencing predetermined evaluation rules, a first set of evaluation values concerning similarities of said extracted words from said machine translation sentences with said extracted words from said standard translation sentences, and a second set of evaluation values concerning similarities of said extracted phrases from said machine translation sentence with said extracted phrases from said standard translation sentences, in accordance with said first and second set of correspondences;

means for computing at least an average value, a variance of said first and second set of evaluation values and average evaluation values for each range of original sentence length;

means for providing at least said average value and said variance and said average evaluation values for each range of original sentence length, to said output device.

18. The apparatus of claim 16 wherein said translating dictionary, said second language dictionary and said second language word correlation dictionary are combined into one dictionary.

19. An apparatus for evaluating a machine translation system which translates an original sentence in a first language to a translation sentence in a second language, the apparatus comprising:

an input device for inputting a first machine translation sentence which is produced by a first machine translation system in accordance with said original sentence, a second machine translation sentence which is produced by a second machine translation system in accordance with said original sentence, and a standard translation sentence corresponding to said original sentence;

a memory for storing a second language dictionary including a part of speech and an inflection pattern of a second language word, and a second language word correlation dictionary including synonyms for the second language word and synonymity degrees of each of said synonyms with said second language word, in a memory;

means for extracting constituent words for said first machine translation sentence based on morphological analysis of said first machine translation sentence by referencing said second language dictionary;

means for extracting phrases included in said first machine translation sentence based on syntactic analysis of said first machine translation sentence;

means for extracting constituent words for said second machine translation sentence based on morphological analysis of said second machine translation sentence by referencing said second language dictionary;

means for extracting phrases included in said second machine translation sentence based on syntactic analysis of said second machine translation sentence;

means for extracting constituent words for said standard translation sentence based on morphological analysis of said standard translation sentence by referencing said second language dictionary;

means for extracting phrases included in said standard translation sentence based on syntactic analysis of said standard sentence;

means for obtaining a first correspondence between a plurality of said extracted constituent words for said first machine translation sentence and a plurality of said extracted constituent words for said standard translation sentence based on synonymities by referencing said second language word correlation dictionary;

means for obtaining a second correspondence between a plurality of said extracted phrases from said first machine translation sentence and a plurality of said extracted phrases from said standard translation sentence in accordance with the first correspondence so that a pair of corresponding words should be included within a pair of corresponding phrases;

means for computing, by referencing a predetermined evaluation rule, a first evaluation value concerning similarities of said extracted words from said first machine translation sentence with said extracted words from said standard translation sentence, and a second evaluation value concerning similarities of said extracted phrases from said first machine translation sentence with said extracted phrases from said standard translation sentence in accordance with said first and second correspondences;

means for obtaining a third correspondence between a plurality of said extracted constituent words for said second machine translation sentence and a plurality of said extracted constituent words for said standard translation sentence based on synonymities by referencing said second language word correlation dictionary;

means for obtaining a fourth correspondence between a plurality of said extracted phrases from said second machine translation sentence and a plurality of said extracted phrases from said standard translation sentence in accordance with the third correspondence so that a pair of corresponding words should be included within a pair of corresponding phrases;

means for computing, by referencing predetermined evaluation rules, a third evaluation value concerning similarities of a plurality of said extracted words from said second machine translation sentence with a plurality of said extracted words from said standard translation sentence, and a fourth evaluation value concerning similarities of a plurality of said extracted phrases from said second machine translation sentence with a plurality of said extracted phrases from said standard translation sentence in accordance with said third correspondences and said forth correspondences; and means for providing said original sentence to an output device, with corresponding said first machine translation sentence, said second machine translation sentence and said standard translation sentence when said first evaluation value and said third evaluation value are different from each other, or when said second evaluation value and said fourth evaluation value are different from each other.

20. An apparatus for evaluating a machine translation system which translates an original sentence in a first language to a translated sentence in a second language, the apparatus comprising:

an input device for inputting (i) a first machine translated sentence in the second language which is produced by the machine translation system as a translation of the original first language sentence, (ii) a second machine translated sentence which is produced by the machine translation system as an alternate translation of said original first language sentence, and (iii) a standard second language sentence corresponding to said original first language sentence;

a second language dictionary memory for storing for each second language word parts of speech, inflection patterns, synonyms, and synonymity degrees of each of said synonyms;

a sentence analyzer for (i) performing a morphological analysis of said first machine translated sentence, said second machine translated sentence, and said standard second language sentence and extracting constituent words from said second language dictionary memory;

correspondence processor for obtaining correspondences between (i) a plurality of said extracting constituent words for said first machine translated sentence and said standard second language sentence and (ii) a plurality of said extracted constituent words for said second machine translation sentence and the standard second language sentence based on synonymities by referencing said second language word correlation dictionary memory;

a computer for computing with a predetermined evaluation rule evaluation values from said correspondences;

an output device for outputting as said original first language sentence, said first machine translated sentence, said second machine translated sentence, and said standard second language sentence in response to said evaluation values for the first and second machine translated sentence being different from each other.

* * * * *

UNITED STATES PATENT AND TRADEMARK OFFICE
CERTIFICATE OF CORRECTION

PATENT NO. : 5,408,410
DATED : April 18, 1995
INVENTOR(S) : Hiroyuki Kaji

It is certified that error appears in the above-indentified patent and that said Letters Patent is hereby corrected as shown below:

Title Page:

[54] In line 3 of the title, the word "SYSTEM" should be deleted and the word --SYSTEMS-- should be substituted therefor.

Column 1, line 3, "SYSTEM" should read --SYSTEMS--.

Signed and Sealed this

Twentieth Day of June, 1995

Attest:

BRUCE LEHMAN

Attesting Officer       Commissioner of Patents and Trademarks